(12) United States Patent
Zhu et al.

(10) Patent No.: US 11,465,268 B2
(45) Date of Patent: Oct. 11, 2022

(54) POWER DEVICE, ELECTRIC POWER TOOL, AND SYSTEM

(71) Applicant: Positec Power Tools (Suzhou) Co., Ltd., Jiangsu (CN)

(72) Inventors: Hang Zhu, Jiangsu (CN); Haibo Zhang, Jiangsu (CN)

(73) Assignee: POSITEC POWER TOOLS (SUZHOU) CO., LTD., Jiangsu (CN)

( * ) Notice: Subject to any disclaimer, the term of this patent is extended or adjusted under 35 U.S.C. 154(b) by 823 days.

(21) Appl. No.: 16/355,104

(22) Filed: Mar. 15, 2019

(65) Prior Publication Data
US 2019/0344419 A1 Nov. 14, 2019

Related U.S. Application Data

(63) Continuation of application No. PCT/CN2017/102526, filed on Sep. 20, 2017.

(30) Foreign Application Priority Data

Sep. 20, 2016 (CN) .......................... 201610834768.8
Sep. 20, 2016 (CN) .......................... 201621066027.1
Mar. 16, 2017 (CN) .......................... 201710158045.5

(51) Int. Cl.
*B25F 5/02* (2006.01)
*B25F 3/00* (2006.01)
*H01M 50/20* (2021.01)

(52) U.S. Cl.
CPC .................. *B25F 5/02* (2013.01); *B25F 3/00* (2013.01); *H01M 50/20* (2021.01); *H01M 2220/30* (2013.01)

(58) Field of Classification Search
CPC ....................................................... B25F 5/00
See application file for complete search history.

(56) References Cited

U.S. PATENT DOCUMENTS

| 2012/0118595 | A1  | 5/2012 | Pellenc |                    |
|--------------|-----|--------|---------|--------------------|
| 2014/0225544 | A1* | 8/2014 | Mergener | G01R 19/165       |
|              |     |        |         | 318/400.22         |
| 2018/0071907 | A1* | 3/2018 | Myhill  | B25F 5/00          |

FOREIGN PATENT DOCUMENTS

| CN | 103282165 A  | 9/2013 |
| CN | 203831361 U  | 9/2014 |
| CN | 204546471 U  | 8/2015 |

(Continued)

OTHER PUBLICATIONS

State Intellectual Property Office of The P.R. China, International Search Report and Written Opinion for PCT/CN2017/102526 (English translation included) dated Nov. 29, 2017.

*Primary Examiner* — Said Bouziane
(74) *Attorney, Agent, or Firm* — Middleton Reutlinger

(57) ABSTRACT

A power device for an electric tool and system is provided that can power tool bodies of different electric tools. The power device includes a power control unit that receives a control instruction transmitted by the tool control unit and controls the motor according to control instructions. The power device not only improves the utilization rate of general modules, such as a motor and a battery pack, but also improves the expandability of the system, reduces the amount of programs in the power device, and eliminates the need to update the programs in the power device to be adapted to a new working body.

19 Claims, 13 Drawing Sheets

(56) References Cited

FOREIGN PATENT DOCUMENTS

| | | | |
|---|---|---|---|
| CN | 105227013 | A | 1/2016 |
| CN | 105818110 | A | 8/2016 |

* cited by examiner

POWER DEVICE, ELECTRIC POWER TOOL, AND SYSTEM

BACKGROUND

Technical Field

The present invention relates to the field of tool operation, and in particular, to a power device capable of powering tool bodies of different electric tools.

The present invention further relates to an electric tool.

The present invention further relates to an electric tool system.

Related Art

A conventional electric tool includes a working component, a motor, a transmission mechanism, a start switch, a control circuit, a battery pack, etc. When the start switch is closed, a circuit between the battery pack and the motor is turned on, and the control circuit controls the motor to start running and perform the corresponding work. When an energy supply unit is a battery pack, the battery pack is detachably connected to the electric tool.

The problem of conventional electric tools is that each type of electric tool requires a motor, a battery pack, a control circuit, and other modules. When a user purchases N different electric tools, the cost is equivalent to the sum of cost of N motors, N control circuits, N battery packs, and N working components. However, in general, the user only uses one electric tool at a time, making other N−1 electric tools idle, which greatly reduces the input-output ratio of the user.

In the prior art, a power device is detachably connected to a tool body. That is, one power device is adaptive to different types of tool bodies, and programs of a plurality of tools are pre-stored in the power device. For example, the power device is adapted to a first tool body, a second tool body and a third tool body, the first tool functionally includes $a_1$, $b_1$ and $c_1$, the second tool functionally includes $a_2$, $b_2$ and $c_2$, and the third tool functionally includes $a_3$, $b_3$ and $c_3$, so it is necessary to preset programs of $a_1$, $b_1$, $c_1$, $a_2$, $b_2$, $c_2$, $a_3$, $b_3$, and $c_3$ in the power device. If $b_1$, $b_2$ and $b_3$ are all speed regulation functions, three programs indicating speed regulation are stored in the power device. In this way, the amount of programs in the power device is large. Moreover, if the power device needs to be adapted to a fourth tool body which functionally includes $a_4$ and $b_4$, since programs corresponding to $a_4$ and $b_4$ are not preset in the power device, the power device cannot recognize a control command of the fourth tool body. If the power device is required to be adapted to the fourth tool body, the program in the power device needs to be updated, and the programs corresponding to $a_4$ and $b_4$ are added, so that the control command of the fourth tool body can be recognized by the power device. Therefore, the prior art has poor expandability and compatibility. Compared with the prior art, there is an urgent need to develop a novel electric tool, which can not only improve the utilization rate of general modules such as a motor and a battery pack, but also improve the expandability of a power device, reduce the amount of programs in the power device and eliminate the need to update the programs in the power device to be adapted to a new working body.

SUMMARY

The technical problem to be resolved by the present invention is to provide an electric tool capable of powering tool bodies of different electric tools.

In order to resolve the foregoing technical problem, the technical solution of the present invention is as follows: A power device, capable of powering different types of tool bodies, wherein the tool body comprises a tool control unit; the power device is detachably connected to the tool body, and the power device comprises a power control unit for controlling a motor; and when the power device is adapted to a certain tool body, the power control unit receives a control instruction transmitted by the tool control unit, and controls the motor according to the control instruction.

Preferably, the tool body further comprises an operation component. The power device receives electric energy from different types of battery packs, and the power control unit receives a control instruction transmitted by a battery pack, and controls the motor according to the control instruction transmitted by the battery pack.

Preferably, the battery pack transmits a control instruction to the tool body, and the tool control unit in the tool body transmits an instruction which includes a control instruction transmitted by the battery pack and a control instruction generated in the tool body to the power control unit.

Preferably, the battery pack transmits a control instruction to the power control unit, and the tool control unit transmits the control instruction to the power control unit for controlling the motor.

Preferably, the tool body has a tool electrical interface, the battery pack has a battery electrical interface, the power device comprises a data bus, and the battery electrical interface of the battery pack and the tool electrical interface of the tool body are respectively connected to the data bus.

Preferably, the tool body has a tool electrical interface, the battery pack has a battery electrical interface, the power device has a device electrical interface, the device electrical interface comprises a first electrical interface and a second electrical interface, the tool electrical interface is electrically connected with the first electrical interface and transmits, at least, the control instruction of the tool body to the power device, and the battery electrical interface is electrically connected with the second electrical interface and transmits, at least, the control instruction of the battery pack to the power device.

Preferably, the battery pack has a battery electrical interface, the power device has a device electrical interface, the battery electrical interface is electrically connected with the device electrical interface and transmits, at least, the control instruction of the battery pack to the power device, and the tool body has a tool electrical interface which is electrically connected with the device electrical interface and transmits, at least, the control instruction of the tool body to the power device.

Preferably, the battery pack has a battery electrical interface, the power device connected a device electrical interface, the tool body has a tool electrical interface which is electrically connected with the device electrical interface and transmits, at least, the control instruction of the tool body to the power device, the battery electrical interface is electrically connected with the tool electrical interface, and the control instruction of the battery pack is transmitted to a power control device through the interior of the tool body.

Preferably, the power control unit preferentially prioritizes the control instruction transmitted by a battery pack.

Preferably, the battery pack is provided with a battery pack control module for detecting battery pack parameter information, converting the battery pack parameter information into a battery pack control instruction and transmitting the battery pack control instruction to the power control unit.

Preferably, the tool control unit converts the control instruction into a control parameter corresponding to the control instruction and transmits the control parameter to the power control unit, and the power control unit receives the control parameter and controls the motor.

Preferably, the power control unit has a program block, the program block has a default value, and the power control unit receives a control instruction transmitted by the tool control unit and writes the control instruction to the default value to form a complete program block to control the motor.

Preferably, the program block is preset with a priority, and the power control unit executes the program block in descending order of the priority.

Preferably, the battery pack is provided with a battery pack control module, the control instruction is preset with a priority, and the tool control unit transmits the control instruction to the power control unit in descending order of the priority.

Preferably, the tool body further comprises an operation component for generating an operation instruction, the control instruction comprises the operation instruction, the tool control unit converts the operation instruction into a control parameter corresponding to the operation instruction and transmits the control parameter to the power control unit, and the power control unit receives the control parameter and converts the control parameter into a control instruction to control the motor.

Preferably, the operation instruction comprises a safety instruction and a manipulation instruction, and when the operation instruction is transmitted from the tool control unit to the power control unit, the safety instruction is preferentially transmitted.

Preferably, the operation instruction comprises a safety instruction and a manipulation instruction, the tool control unit comprises a communication module, the power control unit comprises a communication module, and when the operation instruction is transmitted from the tool control unit to the power control unit through the communication module, the safety instruction is preferentially transmitted.

Preferably, the tool control unit comprises a communication module, the power control unit comprises a communication module, the manipulation instruction is transmitted from the tool control unit to the power control unit through the communication module, and the safety instruction is transmitted from the tool control unit to the power control unit through an analog circuit.

Preferably, the safety instruction comprises a safety brake instruction.

Preferably, the tool control unit further comprises a parameter setting module for storing a preset parameter, the control instruction comprises the preset parameter, the tool control unit converts the preset parameter into a control parameter and transmits the control parameter to the power control unit, and the power control unit receives the control parameter and converts the control parameter into a control instruction to control the motor.

Preferably, the preset parameter comprises at least one of a protection parameter or a running parameter of the motor.

Preferably, the power device further comprising a motor, wherein the motor is a brushless direct current motor.

Preferably, the battery pack supplies electric energy to the motor and the tool body, the battery pack being disposed within the tool body and detachable from the tool body, the power device and the tool body being connected in parallel between the positive and negative electrodes of the battery pack.

Preferably, the electric energy of the battery pack is decomposed into a first path and a second path on the tool body, the first path supplying electric energy to the tool body, the second path supplying electric energy to the power device.

Preferably, the power device further comprising at least one battery pack, wherein the battery pack is detachably provided in the power device.

Preferably, the power device and the tool body are provided with a wireless communication module respectively, and the power device and the tool body wirelessly transmit a control instruction.

Preferably, the tool body wirelessly transmits at least one of a preset parameter or a control instruction with peripheral equipment through the wireless communication module.

Preferably, the power device is provided with a wireless communication module, and the power device wirelessly communicates with peripheral equipment for transmitting use and maintenance information of the motor.

Preferably, the power device and the battery pack are provided with wireless communication modules, and the power device and the battery pack wirelessly transmit a control instruction.

Preferably, the battery pack wirelessly communicates with peripheral equipment for transmitting parameter information of the battery pack.

Preferably, the tool body comprises a tool communication module, the power device comprises a power communication module, the control instruction comprises a safety instruction, the safety instruction is transmitted from the tool control unit to the power control unit through the tool communication module and the power communication module, and the safety instruction is further transmitted from the tool control unit to the power control unit through an analog circuit.

In order to resolve the foregoing technical problem, the technical solution of the present invention is further provided as follows: A power device, capable of receiving electric energy supplied by different types of battery packs, wherein the battery pack comprises a battery pack control unit; the power device comprises a power control unit; and the power device is detachably connected to the battery pack, and the battery pack control unit converts a battery pack instruction into a control parameter corresponding to a control instruction and transmits the control parameter to the power control unit.

Preferably, the power device is capable of powering different types of tool bodies, the tool body comprises a tool control unit, the power device is detachably connected to the tool body, and when the power device is adapted to a certain tool body, the power control unit receives a control instruction transmitted by the tool control unit, and controls the motor according to the control instruction.

Preferably, the power control unit has a program block, the program block has a default value, and the power control unit receives a control parameter transmitted by the battery pack control unit, converts the control parameter into a control instruction, and writes the control instruction to the default value to form a complete program block.

Preferably, the control instruction is transmitted from the battery pack control unit to the power control unit by means of serial communication.

In order to resolve the foregoing technical problem, the technical solution of the present invention is further provided as follows: An electric tool, comprising a tool body and a power device capable of powering different types of tool bodies, wherein the power device comprises the power device as described in any one of the above.

In order to resolve the foregoing technical problem, the invention further provides an electric tool system, comprising at least two tool bodies, and a power device capable of powering the at least two tool bodies.

The beneficial effects after the present invention is implemented are as follows: one power device matches a plurality of tool bodies and battery packs; for example, the power device is adapted to a first tool body, a second tool body and a third tool body, the first tool functionally includes $a_1$, $b_1$ and $c_1$, the second tool functionally includes $a_2$, $b_2$ and $c_2$, and the third tool functionally includes $a_3$, $b_3$ and $c_3$; if $b_1$, $b_2$ and $b_3$ are all speed regulation functions, only one speed regulation program segment needs to be arranged in the power device, and the speed regulation program segment has a default value; when a speed regulation instruction N1 of the first tool body is transmitted into the power device, the power control unit writes the speed regulation instruction N1 to the default value in the speed regulation program segment, that is, the speed regulation instruction N1 is combined with the speed regulation program segment, and a complete speed regulation program is formed to control a motor to operate at a rotating speed N1; and when a speed regulation instruction N2 of the second tool body is transmitted into the power device, the speed regulation instruction N2 is wrote to the default value in the speed regulation program segment, that is, the speed regulation instruction N2 is combined with the speed regulation program segment, and a complete speed regulation program is formed to control the motor to operate at a rotating speed N2. Therefore, if a plurality of tool bodies has the same function, only one program segment is needed, which greatly simplifies the programs in the power device.

When the power device needs to be adapted to a new fourth tool body, the fourth tool body transmits a speed regulation instruction N4 to the power device, the power control unit writes the speed regulation instruction N4 to the default value in the speed regulation program segment, that is, the speed regulation instruction N4 is combined with the speed regulation program segment, and a complete speed regulation program is formed to control the motor to operate at a rotating speed N4. It is unnecessary to update program segments in a pre-power device. In this way, the power device only needs to preset a program segment of a plurality of functions, and can be matched with different types of tool bodies at a later stage without updating the program segments in the power device, thereby greatly expanding the compatibility of the power device.

BRIEF DESCRIPTION OF THE DRAWINGS

The objectives, technical solutions, and beneficial effects of the present invention described above can be achieved by using the following accompanying drawings.

DETAILED DESCRIPTION

Figure 1:
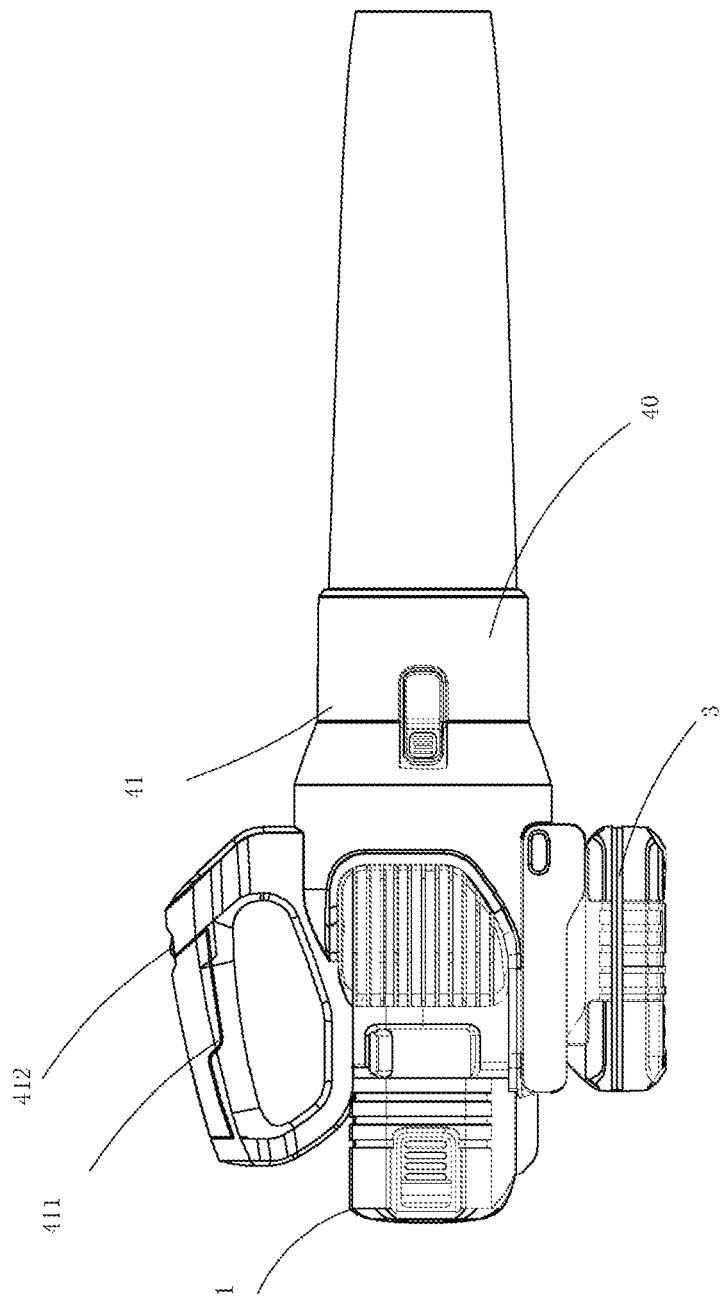
FIG. 1 is a schematic structure diagram of a blower according to a first embodiment of the present invention.

To make the above objectives, features and advantages more comprehensible, detailed embodiments of the present invention are described in further detail with reference to the accompanying drawings. In the following description, numerous specific details are set forth to provide a thorough understanding of the present invention. However, the present invention may be embodied in many different forms than those described herein, and those skilled in the art may make similar modifications without departing from the spirit of the present invention. Therefore, the present invention is not limited to the specific embodiments disclosed below.

An embodiment of the present invention provides an electric tool. The electric tool includes a power device and a tool body, where the power device is detachably mounted on the tool body, and is capable of powering a tool body of at least one electric tool. The power device further includes a motor, and a battery pack supplies electric energy to the motor and the tool body. The battery pack is disposed within the tool body and is detachable from the tool body. In the present invention, the power device and the battery pack are two separated parts, independent of each other, that is, a mounting interface for the power device and the tool body is different from a mounting interface for the battery pack and the tool body. Optionally, the power device and the tool body are connected in parallel between the positive and negative electrodes of the battery pack. The tool body may be a suction blower tool body, a grass trimmer tool body, a chain saw tool body, a pruning shear tool body, an electric drill, an oscillator, etc., and the tool body may also be a hand-push type electric tool body such as a lawnmower tool body. The power device is detachably mounted in at least one of the foregoing tool bodies. When the power device is mounted on any tool body and the battery pack is mounted in the same tool body, a complete electric tool is constituted to perform the work performed by this type of electric tool. Alternatively, the power device may include a battery pack, that is, the battery pack and the power device may be integrated together and mounted on the tool body through the same interface.

According to the electric tool in the foregoing embodiment, a power control unit receives a control instruction transmitted by a tool control unit to control the motor. The control instruction is converted into a control parameter by the tool control unit and transmits the control parameter to the power control unit, the power control unit receives the control parameter transmitted by the tool control unit and converts the control parameter into a corresponding control instruction to control the motor, thus driving working components to perform the corresponding work. Therefore, one power device may be adapted to different tool bodies, and the motor is controlled according to operation instructions generated by operation components of different tool bodies.

The control parameter includes an operation instruction triggered by a human-machine interface on the operation component such as an operation switch, a panel and a button, and a preset parameter stored in a parameter setting module in the tool control unit. When the power device is mounted on the tool body, the tool control unit updates a preset parameter stored in the power control unit. For example, when the tool body to be connected to needs to be replaced with another type of tool body due to actual operation occasions or product replacement requirements, the rated power or rotating speed of the tool body after replacement is different from that before replacement. At this time, the power control unit acquires the preset parameter pre-stored in the tool control unit, so that the power control unit adjusts the output power or rotating speed of the motor of the power device to match the rated power or rotating speed of the tool body after replacement. Preferably, when the power device is changed from a certain type of tool body originally adapted to another type of tool body, the power control unit receives the control parameter transmitted by the tool control unit, and configures a start parameter, a protection parameter and relevant function parameters of the motor, etc., so that the motor can be normally started and protected, and can perform the corresponding functions.

FIG. 1 shows a schematic structure diagram of a blower according to a first embodiment of the present invention. The blower includes a blower body 40, and a power device 1 and a battery pack 3 detachably connected to the blower body 40, where the power device 1 and the battery pack 3 are two separated parts, independent of each other and detachable from the blower body 40 respectively, and the power device 1 and the battery pack 3 may also be adapted to other tool bodies to constitute another electric tool. A mounting interface for the power device 1 and the blower body 40 is different from a mounting interface for the battery pack 3 and the blower body 40, the power device 1 is detachably mounted between a handle 411 and the battery pack 3, is located near one end of an air inlet of a blower tool housing 41, and supplies kinetic energy for the work of the blower. Specifically, a main housing of the power device 1 and the blower tool housing 41 are detachably mounted. In this embodiment, the battery pack 3 may be mounted on an opposite side of the handle 411 or on one side of the handle 411.

The power device 1 includes a main housing, a motor located in the main housing, and a power control unit located in the main housing to control the motor to work, the blower body 40 includes the blower tool housing 41 with the handle 411, an air inlet and an air outlet are provided on the blower tool housing 41, a tool control unit is provided in the blower tool housing 41, the battery pack 3 is provided below the handle 411, and the handle 411 is provided with an operation component for controlling the motor to work, which specifically includes a start switch, a turbo switch and a speed regulation knob 412. When the power device 1 is connected with the blower body 40, the motor in the power device 1 may be connected with a fan of the blower body 40, may drive the fan to work, and may thus drive the blower to work. The start switch is configured to control the on and off of electric energy transmission between the battery pack 3 and the power device 1 and to control the on and off of electric energy transmission between the battery pack 3 and the blower body 40. The blower has different air speeds at work, and the air speed of the blower is adjusted by the turbo switch and the speed regulation knob 412 on the operation component specifically, where the speed regulation knob 412 is provided with a potentiometer, and different positions of the potentiometer correspond to different voltages. Thus, the motor may be controlled to achieve multi-gear speed regulation, that is, the speed regulation knob 412 is rotated to different positions, corresponding to different rotating speeds of the motor, and thus the blower has different air speeds.

In the foregoing embodiment, the power device 1 and the battery pack 3 are separately detachable from the blower body 40, and there is no direct mechanical connection or electrical connection between the power device 1 and the battery pack 3. In an alternative embodiment, there is a direct mechanical connection or electrical connection between the power device 1 and the battery pack 3. For example, the power device 1 includes a data bus, and an electrical interface of the battery pack 3 and an electrical interface of the blower body 40 are connected to the data bus separately. In another alternative embodiment, the power device 1 includes a battery pack 3, the battery pack 3 transmits a control signal and electric energy directly to the power device 1, and the blower body 40 transmits a control signal to the power device 1. The power device 1 further includes a motor, where the motor 13 is a brushless motor, and the working component is driven by the brushless motor, that is, the power of the brushless motor may be transmitted to an action component. The power control unit is located behind the brushless motor to control the commutation and rotating speed of the brushless motor.

Figure 2:
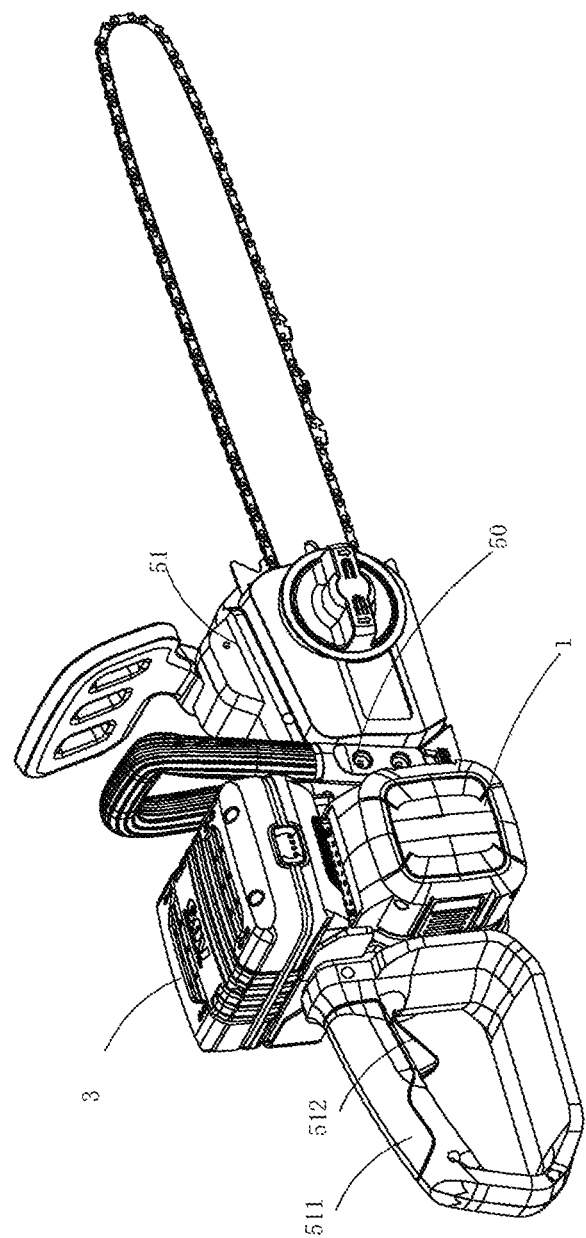
FIG. 2 is a schematic structure diagram of a chain saw according to a second embodiment of the present invention.

The power device 1 may also be mated with another tool body such as a chain saw body, and drive same to work. FIG. 2 shows a schematic structure diagram of a chain saw according to a second embodiment of the present invention. The chain saw includes a chain saw body 50, and a power device 1 and a battery pack 3 detachably connected to the chain saw body 50. The power device 1 and the battery pack 3 are two separated parts, independent of each other. A mounting interface for the power device 1 and the chain saw body 50 is different from a mounting interface for the battery pack 3 and the chain saw body 50. The battery pack 3 is detachably mounted on a side of a chain saw tool housing 51 near a handle 511, specifically on an upper surface of the side near the handle 511, and the power device 1 is mounted on a side surface of the side of the chain saw tool housing 51 near the handle 511. A main housing of the power device 1 and the chain saw tool housing 51 are detachably mounted. The power device 1 includes a main housing, a motor located in the main housing and configured to drive the chain saw to work, and a power control unit located in the main housing and electrically connected to the motor. The chain saw body 50 includes the chain saw tool housing 51 with a handle 511, a tool control unit is provided in the chain saw tool housing 51, and the chain saw tool housing 51 is provided with an operation component, including a start switch 512 and a safety brake switch. The start switch 512 is configured to control the on and off of electric energy transmission between the battery pack 3 and the power device 1 and to control the on and off of electric energy transmission between the battery pack 3 and the chain saw body 50.

The safety brake switch on the chain saw body 50 is configured to control the off of a working circuit in case of an emergency brake, and the start switch is a main switch of the working circuit, which may also simultaneously control the energization and deenergization of other electronic components. Only when the start switch is closed, the circuit is energized and the safety brake switch is closed, the motor 13 can be started for normal work. When the brake is needed, a protective plate is pulled forward to trigger the safety brake switch. At this time, the tool control unit transmits a generated safety brake instruction to the power control unit through the tool control unit, the power control unit controls a motor drive circuit to stop sending a drive signal to the motor, and the motor 13 stops operating. Preferably, the foregoing embodiment further includes an alarm device. When the safety brake switch is triggered and the chain saw brakes, a buzzer of the alarm device starts an alarm to inform a user that the chain saw is in a braking state at this time, thereby preventing a new user from accidentally touching the safety brake switch and from threatening personal safety. When the protective plate of the chain saw is in a forward pulling state, the safety brake switch is triggered, the motor 13 does not work, and the buzzer alarms to inform the user that the chain saw is in the braking state at this time.

In the foregoing embodiment, the power device 1 and the battery pack 3 are separately detachable from the chain saw body 50, and there is no direct mechanical connection or electrical connection between the power device 1 and the battery pack 3. In an alternative embodiment, there is a direct mechanical connection or electrical connection between the power device 1 and the battery pack 3. For example, the power device 1 includes a data bus, and an electrical interface of the battery pack 3 and an electrical interface of the chain saw body 50 are connected to the data bus separately. In another alternative embodiment, the power device 1 includes a battery pack 3, the battery pack 3 transmits a control signal and electric energy directly to the power device 1, and the chain saw body 50 transmits a control signal to the power device 1. The power device 1 further includes a motor, where the motor 13 is a brushless motor, and the working component is driven by the brushless motor, that is, the power of the brushless motor may be transmitted to an action component. The power control unit is located behind the brushless motor to control the commutation and rotating speed of the brushless motor.

Figure 3:
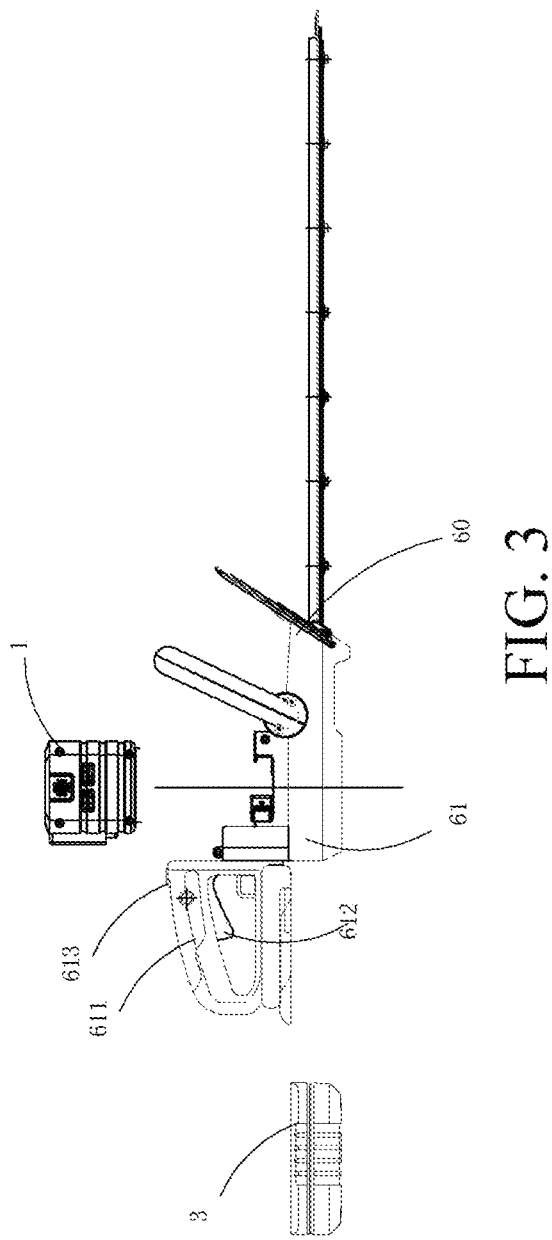
FIG. 3 is a schematic structure diagram of a pruning shear according to a third embodiment of the present invention.

The power device 1 may also be mated with another tool body such as a pruning shear body, and drive same to work. FIG. 3 shows a schematic structure diagram of a pruning shear according to a third embodiment of the present invention. The pruning shear includes a pruning shear body 60, and a power device 1 and a battery pack 3 detachably connected to the pruning shear body 60, where the power device 1 and the battery pack 3 are two separated parts, independent of each other. A mounting interface for the power device 1 and the pruning shear body 60 is different from a mounting interface for the battery pack 3 and the pruning shear body 60. The pruning shear body 60 includes a pruning shear tool housing 61 with a handle 611, a tool control unit is provided in the pruning shear tool housing 61, and the handle 611 is provided with an operation component for controlling the motor 13 to work, the operation component including a start switch 612, an anti-stalling switch 613, etc. The power device 1 is detachably mounted on a side of the pruning shear tool housing 61 near the handle 611, and supplies kinetic energy for the work of the pruning shear. Specifically, a main housing of the power device 1 and the pruning shear tool housing 61 are detachably mounted. The battery pack 3 is detachably mounted below the handle 611 on the pruning shear tool housing 61, and supplies kinetic energy to the pruning shear body 60 and the power device 1. The power device 1 includes a main housing, a motor located in the main housing and configured to drive the pruning shear to work, and a power control unit located in the main housing and electrically connected to the motor. The start switch 612 is configured to control the on and off of electric energy transmission between the battery pack 3 and the power device 1 and to control the on and off of electric energy transmission between the battery pack 3 and the pruning shear body 60. The anti-stalling switch 613 is configured to prevent the pruning shear from being stalled at work. The anti-stalling switch 613 is triggered to activate an anti-stalling function. When stalling is detected, the motor rotates reversely for a preset time. If stalling continues to be detected, the motor rotates forward for a preset time. The operation is performed alternately until a cutter head is no longer stuck.

In the foregoing embodiment, the power device 1 and the battery pack 3 are separately detachable from the pruning shear body 60, and there is no direct mechanical connection or electrical connection between the power device 1 and the battery pack 3. In an alternative embodiment, there is a direct mechanical connection or electrical connection between the power device 1 and the battery pack 3. For example, the power device 1 includes a data bus, and an electrical interface of the battery pack 3 and an electrical interface of the pruning shear body 60 are connected to the data bus separately. In another alternative embodiment, the power device 1 includes a battery pack 3, the battery pack 3 transmits a control signal and electric energy directly to the power device 1, and the pruning shear body 60 transmits a control signal to the power device 1. The power device 1 further includes a motor, where the motor 13 is a brushless motor, and the working component is driven by the brushless motor, that is, the power of the brushless motor may be transmitted to an action component. The power control unit is located behind the brushless motor to control the commutation and rotating speed of the brushless motor.

Figure 4:
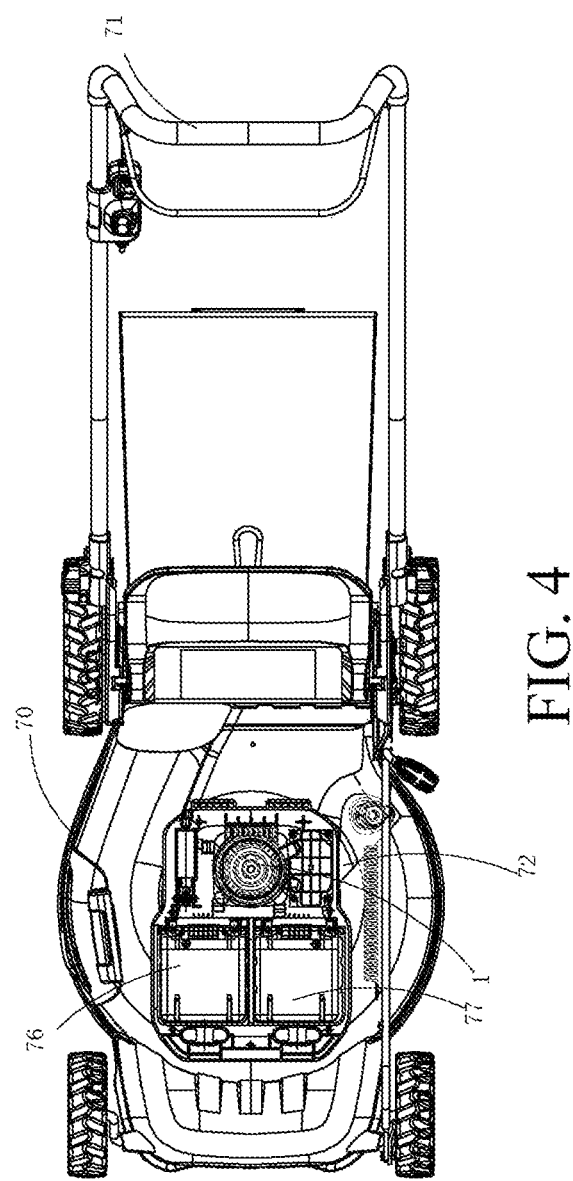
FIG. 4 is a schematic structure diagram of a lawnmower according to a fourth embodiment of the present invention.
Figure 5:
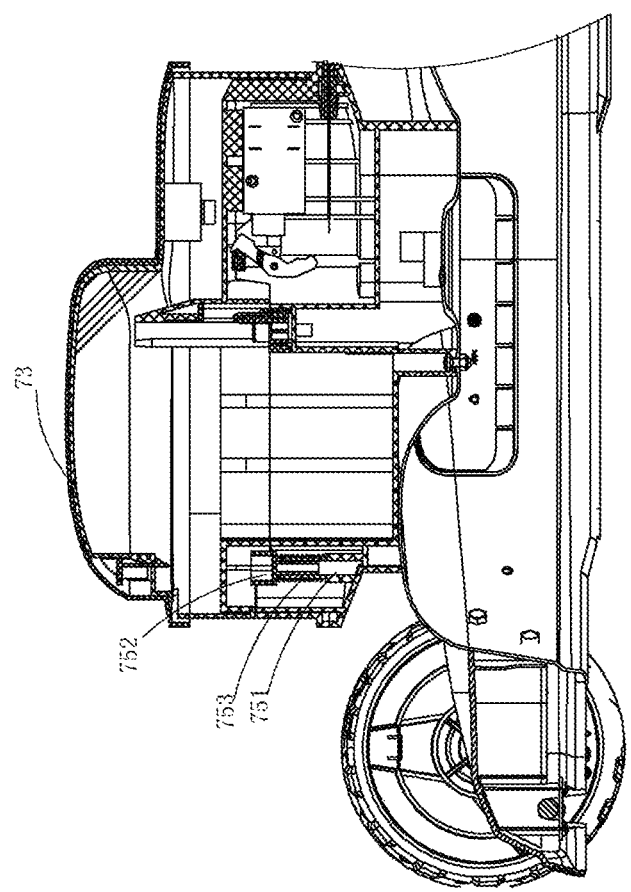
FIG. 5 is a schematic structure diagram showing a closed state of a cavity of the lawnmower according to the fourth embodiment of the present invention.
Figure 6:
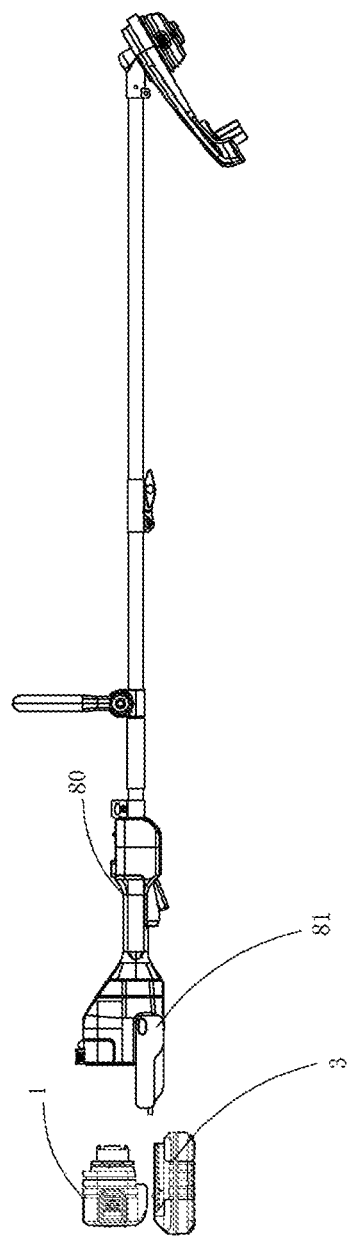
FIG. 6 is a schematic structure diagram of a grass trimmer according to a fifth embodiment of the present invention.

The power device 1 may also be mated with another tool body such as a lawnmower body, and drive same to work. FIG. 4 shows a schematic structure diagram of a lawnmower according to a fourth embodiment of the present invention. The lawnmower includes a lawnmower body 70, and a power device 1 and a battery pack 3 detachably connected to the lawnmower body 70, where the power device 1 and the battery pack 3 are two separated parts, independent of each other. The power device 1 includes a main housing, a motor located in the main housing and configured to drive the lawnmower to work, and a power control unit located in the main housing and electrically connected to the motor. The lawnmower body 70 includes a lawnmower tool housing with a push rod 71, and the push rod 71 is provided with an operation component for controlling the motor to achieve the corresponding function. A mounting interface for the power device 1 and the lawnmower body 70 is different from a mounting interface for the battery pack 3 and the lawnmower body 70. For the lawnmower as shown in FIG. 5 and FIG. 6, the lawnmower body 70 is provided with a cavity 72 for accommodating the power device 1 and the battery pack 3, where the battery pack 3 and the power device 1 are detachably mounted in the cavity 72. The lawnmower body 70 is further provided with a cover 73 that cooperates with the cavity 72 to close the battery pack 3 and the power device 1 in the cavity 72. The cover 73 is provided with a lock button, the cover 73 may be opened by pressing the lock button, and the cover 73 and the cavity 72 may also be locked.

In the foregoing embodiment, two battery pack mounts 74 are provided in the cavity 72 of the lawnmower body 70, located in front of the power device 1 respectively, and configured for a first battery pack and a second battery pack to be detachably mounted respectively. The first battery pack and the second battery pack are connected in parallel. When the cover is in an open state, the electric energy of the battery pack 3 cannot be transmitted to the power device 1 and the lawnmower body 70. When the cover of the lawnmower is in a closed state, the electric energy of the battery pack 3 is transmitted to the power device 1 and the lawnmower body 70.

The foregoing lawnmower uses two battery packs 3 to provide a working current, and the first battery pack and the second battery pack provide a working current in parallel. Since a negative electrode of the first battery pack and a negative electrode of the second battery pack are connected in parallel, when only one battery pack is mounted on the battery pack mount, the other battery pack mount is also energized. At this time, if a user touches the other battery pack mount, the risk of electric shock may be caused, which may affect personal safety.

In order to resolve the foregoing technical problem, refer to FIG. 5. FIG. 5 is a schematic structure diagram showing a closed state of a cavity of the lawnmower according to the foregoing embodiment of the present invention. An outer edge of the cavity 72 of the lawnmower is provided with two contact members 75. When the cover 73 is in the closed state, the two contact members move downward, a negative electrode of a first battery pack mount 76 and a negative electrode of a second battery pack mount 77 are connected in parallel, the circuit is turned on, and the first battery pack and the second battery pack are connected in parallel to supply electric energy to the power device 1 and the lawnmower body 70. When the cover 73 is in the open state, the two contact members move upward, the negative electrode of the first battery pack mount 76 and the negative electrode of the second battery pack mount 77 are disconnected without contacting each other, and the first battery pack and the second battery pack cannot supply electric energy to the power device 1 and the lawnmower body 70.

Preferably, in this embodiment, the contact member 75 includes a fixed contact member 751 and a movable contact member 752. A spring 753 is sleeved over the fixed contact member 751. When the cover 73 is in the closed state, that is, when the cover 73 and the cavity 72 are locked, the cover 73 presses the cavity 72, so that the movable contact member 752 moves downward to come into contact with the fixed contact member 751, two electrical terminals of the battery pack mount are electrically contacted, and the negative electrode of the first battery pack mount 76 and the negative electrode of the second battery pack mount 77 are connected in parallel. When the cover 73 is opened, the pressure acting on the movable contact member 752 disappears, and under the action of the spring 753, the movable contact member 752 is bounced off the fixed contact member 751. At this time, the negative electrode of the first battery pack mount 76 is disconnected from the negative electrode of the second battery pack mount 77 to prevent an electric shock hazard caused when a battery pack is mounted on one battery pack mount while a user is in contact with the other battery pack mount.

The foregoing lawnmower uses at least two battery pack mounts to increase the number of battery packs 3 that can be mounted. In this way, at least two battery packs 3 may be simultaneously mounted on the lawnmower body. Therefore, the electric energy of the lawnmower is doubled, and under the same working condition, the endurance of the lawnmower is doubled, so that the frequency of battery replacement is significantly reduced, and time is saved. In addition, since the electric tool may simultaneously use at least two battery packs 3 and the at least two battery packs 3 are connected in parallel, the current that can be supplied by the electric tool is at least doubled, so that the load that can be driven by the electric tool is greater, the time for continuous work increases, and the working efficiency is increased correspondingly. Therefore, the electric tool has the advantages of less battery replacement and high working efficiency. Alternatively, the lawnmower may be provided with a plurality of battery pack mounts, and a plurality of battery packs may be mounted on the lawnmower simultaneously. When the lawnmower needs to work under a large voltage, the plurality of battery packs may be connected in series to supply electric energy to the lawnmower. Under the same power condition, the series manner causes a small current and a low heating value of the lawnmower.

In the foregoing embodiment, the power device 1 and the battery pack 3 are separately detachable from the lawnmower body 70, and there is no direct mechanical connection or electrical connection between the power device 1 and the battery pack 3. In an alternative embodiment, there is a direct mechanical connection or electrical connection between the power device 1 and the battery pack 3. For example, the power device 1 includes a data bus, and an electrical interface of the battery pack 3 and an electrical interface of the lawnmower body 70 are connected to the data bus separately. In another alternative embodiment, the power device 1 includes a battery pack 3, the battery pack 3 transmits a control signal and electric energy directly to the power device 1, and the lawnmower body 70 transmits a control signal to the power device 1. The power device 1 further includes a motor, where the motor 13 is a brushless motor, and the working component is driven by the brushless motor, that is, the power of the brushless motor may be transmitted to an action component. The power control unit is located behind the brushless motor to control the commutation and rotating speed of the brushless motor.

The power device 1 may also be mated with another tool body such as a grass trimmer body, and drive same to work. FIG. 6 shows a schematic structure diagram of a grass trimmer according to a fifth embodiment of the present invention. The grass trimmer includes a grass trimmer body 80 extending longitudinally, and a power device 1 and a battery pack 3 detachable from the grass trimmer body 80, where the power device 1 and the battery pack 3 are two separated parts, independent of each other. A mounting interface for the power device 1 and the grass trimmer body 80 is different from a mounting interface for the battery pack 3 and the grass trimmer body 80. The power device 1 includes a main housing, a motor located in the main housing and configured to drive the grass trimmer to work, and a power control unit located in the main housing and electrically connected to the motor, the grass trimmer body 80 includes a grass trimmer tool housing 81 with a handle, a tool control unit is provided in the grass trimmer tool housing 81, and the handle is provided with an operation component for controlling the motor to work, which specifically includes a start switch, a turbo switch and a speed regulation knob. The main housing of the power device 1 and the grass trimmer tool housing 81 are detachably mounted, the battery pack 3 is detachably mounted on a side surface of one end of the power device 1, and electric energy is supplied to the grass trimmer body 80 and the power device 1. A working component is mounted at one end of the grass trimmer tool housing 81, and the power device 1 for driving the movement of the working component is detachably mounted at the other end of the grass trimmer tool housing 81. The start switch is configured to control the on and off of electric energy transmission between the battery pack 3 and the power device 1 and to control the on and off of electric energy transmission between the battery pack 3 and the grass trimmer body 80. The grass trimmer has different speeds at work, and the speed of the grass trimmer is adjusted by the turbo switch and the speed regulation knob on the operation component specifically, where the speed regulation knob is provided with a potentiometer, multi-gear speed regulation can be achieved, that is, the speed regulation knob is rotated to different positions, corresponding to different rotating speeds of the motor, and thus the working component has different speeds.

In the foregoing embodiment, the power device 1 and the battery pack 3 are separately detachable from the grass trimmer body 80, and there is no direct mechanical connection or electrical connection between the power device 1 and the battery pack 3. In an alternative embodiment, there is a direct mechanical connection or electrical connection between the power device 1 and the battery pack 3. For example, the power device 1 includes a data bus, and an electrical interface of the battery pack 3 and an electrical interface of the grass trimmer body 80 are connected to the data bus separately. In another alternative embodiment, the power device 1 includes a battery pack 3, the battery pack 3 transmits a control signal and electric energy directly to the power device 1, and the grass trimmer body 80 transmits a control signal to the power device 1. The power device 1 further includes a motor, where the motor 13 is a brushless motor, and the working component is driven by the brushless motor, that is, the power of the brushless motor may be transmitted to an action component. The power control unit is located behind the brushless motor to control the commutation and rotating speed of the brushless motor.

As will be appreciated by those skilled in the art, in addition to the blower, the chain saw, the pruning shear, the lawnmower and the grass trimmer in the foregoing embodiment, the tool body in the present invention may also be a multi-function machine body, an electric drill body, etc, which will not be described in detail here in the present invention In the present invention, the tool control unit converts a control instruction into a control parameter corresponding to the control instruction and transmits the control parameter to the power control unit, and the power control unit receives the control parameter and converts the control parameter into a control instruction to control of the motor. The power control unit has a program block, the program block has a default value, and the power control unit receives a control instruction transmitted by the tool control unit and writes the control instruction to the default value to form a complete program block to control the motor. The program block is preset with a priority, and the power control unit executes the program block in descending order of the priority.

The control parameter includes a preset parameter pre-stored in a parameter setting module and an operation instruction triggered by the operation component, the tool control unit converts the operation instruction into a control parameter corresponding to the operation instruction and transmits the control parameter to the power control unit, and the power control unit receives the control parameter and converts the control parameter into a control instruction to control the motor. The operation instruction includes a safety instruction and a manipulation instruction, and when the operation instruction is transmitted from the tool control unit to the power control unit, the safety instruction is preferentially transmitted.

When the power device 1 is adapted to a certain tool body, the power control unit receives a control instruction transmitted by the tool control unit, and controls the rotation of the motor according to the control instruction, thus controlling the working component to work. The power control unit further receives the control instruction transmitted by the battery pack 3, the power control unit prioritizes the transmission of the control instruction transmitted by the battery pack 3, the battery pack is provided with a battery pack control module for detecting battery pack parameter information, the control instruction transmitted by the battery pack 3 includes parameter information of the battery pack 3, and the battery pack 3 converts the battery pack parameter information into a battery pack control instruction and transmits the battery pack control instruction to the power control unit.

Specifically, parameters such as the voltage, temperature, and current of the battery pack 3 are included. The power control unit receives the parameter information of the battery pack 3 and determines whether the battery pack 3 reaches a protection state. If so, the battery pack 3 is controlled to stop supplying power or change a charging mode. For example, charging of two battery packs in parallel is changed into charging of one battery pack, or the rotating speed of the motor is reduced.

Figure 7:
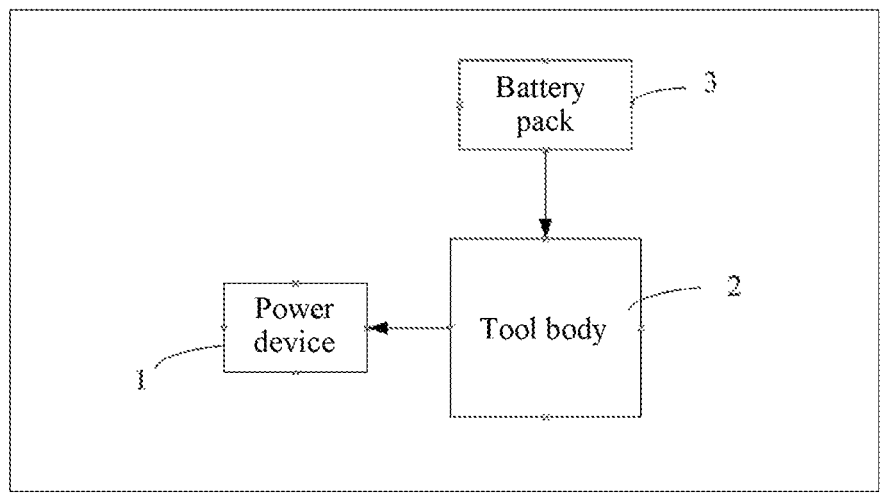
FIG. 7 is a schematic circuit structure diagram of an electric tool according to a sixth embodiment of the present invention.

Specifically, refer to FIG. 7 which is a schematic circuit structure diagram of an electric tool according to a sixth embodiment of the present invention. The battery pack 3 transmits a control instruction in the battery pack 3 to the tool body 2, and the tool body 2 aggregates the received control instruction of the battery pack 3 and a control instruction generated in the tool body 2 and then transmits the instructions to the power device 1. Specifically, the battery pack 3 transmits the parameter information of the battery pack 3 to the tool control unit, and the preset parameter pre-stored in the parameter setting module in the tool control unit, the operation instruction generated by the operation component and the parameter information of the battery pack 3 received by the tool control unit are aggregated and transmitted together to the power control unit. That is, in this embodiment, the battery pack 3 and the power device 1 have no direct signal transmission, and the control instruction of the battery pack 3 is first transmitted to the tool body 2 and then transmitted to the power device 1 together with a running instruction of the motor in the tool body 2, so that communication terminals are saved, thus saving costs.

In another embodiment of the present invention, the battery pack 3 transmits the control instruction to the power device 1 separately, and the tool body 2 transmits the control instruction to the power device 1. In this embodiment, the battery pack 3 and the power device 1 have direct signal transmission, and a control signal of the battery pack 3 may be directly transmitted to the power device 1.

Figure 8:
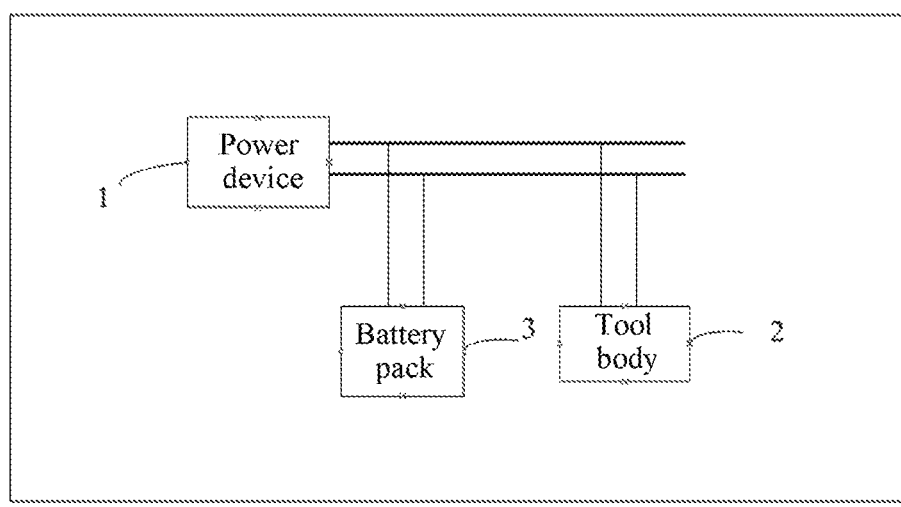
FIG. 8 is a schematic circuit structure diagram of the electric tool according to a seventh embodiment of the present invention.

Specifically, refer to FIG. 8 which is a schematic circuit structure diagram of the electric tool according to a seventh embodiment of the present invention. In this embodiment, the tool body 2 has a tool electrical interface, the battery pack 3 has a battery electrical interface, the power device 1 has a device electrical interface, and the tool electrical interface and the battery electrical interface are separately connected with the device electrical interface to transmit, at least, the control instructions of the tool body 2 and the battery pack 3 to the power device 1. That is, a data bus is connected to the electrical interface of the power device 1, and the battery pack 3 and the tool body 2 are connected to the data bus through the electrical interface. It should be noted that more battery packs 3 or tool bodies 2 may be connected to the bus and communicate with the power device 1 respectively, so that expandability and compatibility of the power device 1 is improved. The foregoing electrical interface may not only transmit a control signal, but also transmit an electrical signal, and the electric energy of the battery pack 3 is transmitted to the power device through the battery electrical interface.

Figure 9:
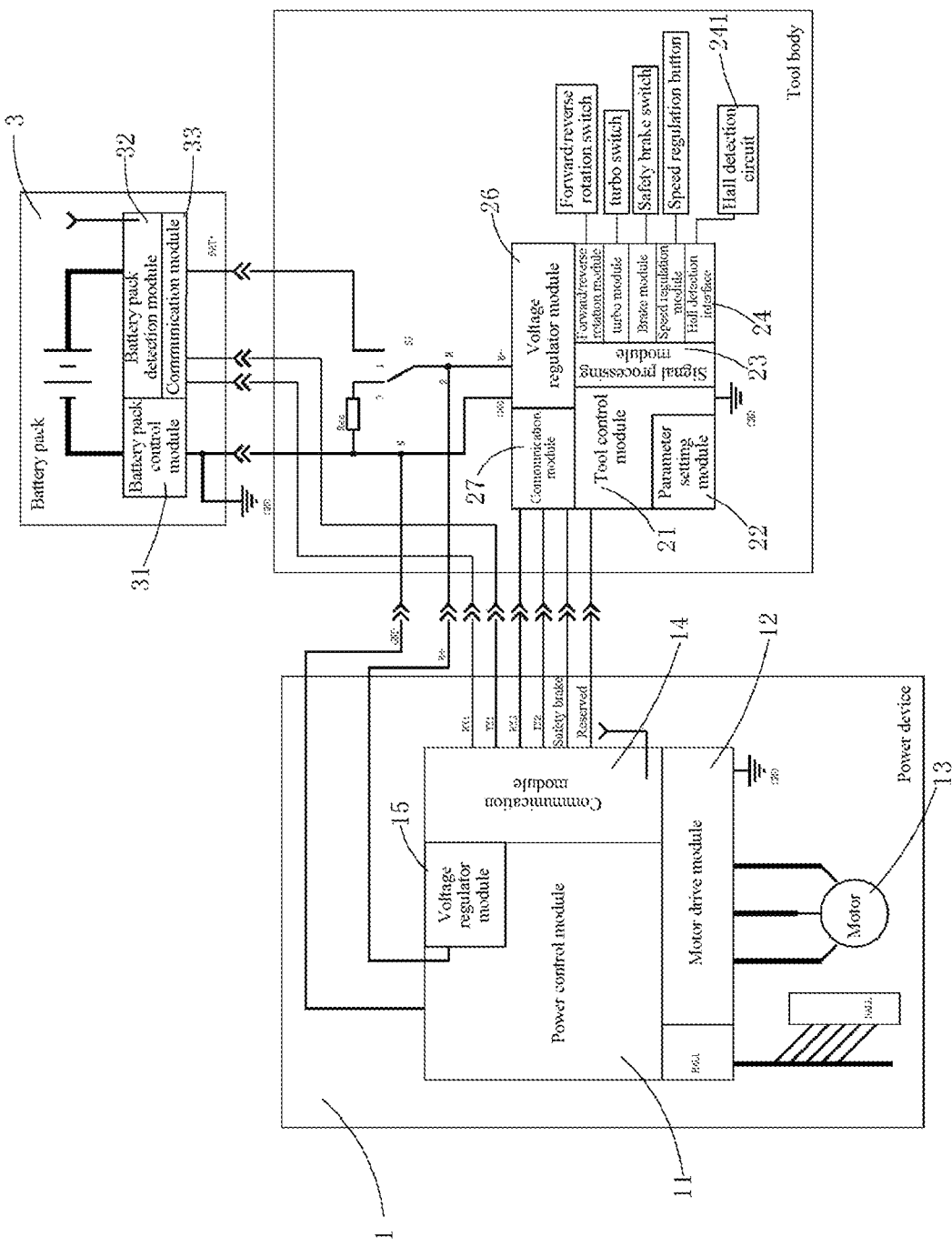
FIG. 9 is a schematic circuit structure diagram of the electric tool according to an eighth embodiment of the present invention.

Specifically, FIG. 9 is a schematic circuit structure diagram of the electric tool according to an eighth embodiment of the present invention. In this embodiment, the tool body 2 has a tool electrical interface, the battery pack 3 has a battery electrical interface, the power device 1 has a device electrical interface, the device electrical interface includes a first electrical interface and a second electrical interface, the tool electrical interface is electrically connected with the first electrical interface to transmit, at least, the control instruction of the tool body 2 to the power device 1, and the battery electrical interface is electrically connected with the second electrical interface to transmit the control instruction and electric energy of the battery pack 3 to the power device 1. When the power control unit receives the control instruction transmitted by the tool body and the control instruction transmitted by the battery pack 3, the power control unit prioritizes the control instruction of the battery pack 3.

In another embodiment of the present invention, the battery pack includes a battery electrical interface, the power device includes a device electrical interface, the battery electrical interface is electrically connected with the device electrical interface and transmits, at least, the control instruction of the battery pack to the power device, and the tool body includes a tool electrical interface which is electrically connected with the device electrical interface and transmits, at least, the control instruction of the tool body to the power device. In this embodiment, the battery pack may be detachably connected to the power device through an electrode holder, and may communicate with the power device. The power device is connected to the tool body after being adapted to the battery pack, and the power device receives a control signal transmitted by the tool body to control the motor. The battery electrical interface not only transmits the control instruction, but also transmits the electric energy of the battery pack.

In another embodiment of the present invention, the tool electrical interface is electrically connected with the device electrical interface and transmits, at least, the control instruction of the tool body to the power device, the battery electrical interface is electrically connected with the tool electrical interface, and the control instruction of the battery pack is transmitted to a power control device through the interior of the tool body. In this embodiment communication terminals are saved relative to the prior art.

Specifically, as shown in FIG. 9, the power control unit in the power device 1 includes a power control module 11, a communication module 14 and a motor drive module 12. The tool control unit in the tool body includes a tool control module 21, a communication module 27, a signal processing module 23 and a function conversion module. The tool control module 21 has the parameter setting module 22, and the parameter setting module 22 pre-stores parameters for updating parameters in the power control module 11, the parameters including a start parameter, a protection parameter, a function parameter, tool information confirmation, a basic running status parameter, a brake shutdown parameter, a function switching parameter, a gear shift parameter, a switching speed regulation parameter, etc. The power control unit and the tool control unit transmit data based on serial protocol two-way communication.

The parameters pre-stored in the parameter setting module 22 are transmitted from the tool control unit to the power control unit by means of serial communication. Specifically, the parameters in the parameter setting module 22 are transmitted to the communication module 27, the communication module 27 converts the parameters into control parameters according to a communication protocol and transmits the control parameters to the communication module 14, the communication module 14 converts the parameters into preset parameters and transmits the preset parameters to the power control module 11, and the power control module 11 performs reconfiguration according to the received preset parameters. It should be noted here that the preset parameters in the parameter setting module 22 may also be transmitted from the tool control unit to the power control unit by means of wireless transmission.

Referring to FIG. 9 to FIG. 14, the battery pack 3 has a battery pack control unit. The battery pack control unit includes a battery pack detection module 32, a battery pack control module 31 and a battery pack communication module 33. The battery pack control module 31 transmits parameter information of a discharge state of the battery pack 3 detected by the battery pack detection module 32, such as a discharge current, a battery pack temperature, a current voltage and other signals to the power control module 11, and the power control module 11 allows the battery pack 3 to supply energy to the power device 1 or prohibits the battery pack 3 from supplying energy to the power device 1 according to the received parameter information of the battery pack.

Referring to FIG. 9 to FIG. 14, a power switch S1 corresponds to a tool start switch, and the power switch S1 has two states. When the power switch S1 is in the first state, that is, a contact 2 of the power switch S1 is connected to a contact point 1, the whole circuit is in a closed state, the circuit is turned on, and the battery pack 3 supplies electric energy to the tool body and the power device 1 separately. Specifically, a current flows out from a positive electrode of the battery pack 3, and is branched into two currents at a node M after passing through the power switch S1, one of the currents reaches a positive electrode of a voltage regulator module 26 on a circuit board of the tool body, the voltage regulator module 26 performs voltage regulation to supply electric energy to the tool control unit, and after receiving the electric energy, the tool control module 21, the parameter setting module 22, the signal processing module 23, the communication module 27 and other function modules in the tool control unit start working. A current flowing out of the tool control unit is returned to the negative electrode of the battery pack 3 through a node N from each negative electrode of the tool control unit to form a complete current loop; another current reaches the voltage regulator module 15 on the power control unit in the power device 1 from the node M, after the voltage regulator module 15 performs voltage regulation, the power control unit is supplied with electric energy, and the power control module 11, the communication module 14, the drive module 12 and the motor 13 in the power control unit receive the electric energy and start working; and a current flowing out from the power control unit is returned to the negative electrode of the battery pack 3 through the node N from a negative electrode of the power control unit to form a complete current loop. When the power switch S1 is in the second state, that is, the contact 2 of the power switch S1 is connected to a contact point 3, the whole circuit is in an off state, the battery pack 3 cannot supply electric energy to the power control unit and the tool control unit, and the tool is in a power-off state.

In a preferred embodiment, the electric energy of the battery pack 3 is directly transmitted to the tool control unit, but the electric energy of the battery pack 3 cannot be directly transmitted to the power control unit, that is, for electric energy transmission between the battery pack 3 and the power device 1, a connector in the tool body is required to transmit electric energy to the power device 1, such that the battery pack supplies electric energy to the motor 13. That is, in the present invention, there is no direct mechanical connection or electrical connection between the power device 1 and the battery pack 3, and the electric energy of the battery pack 3 is transmitted to the power device 1 through the interior of the tool body. Specifically, a connector is provided in the tool body, the battery pack 3 is electrically connected to one end of the connector, and the other end of the connector is electrically connected to the power device 1. When the power device 1 is detachably mounted on any tool body, the battery pack 3 is connected to the tool body through the connector to realize a mechanical and/or electrical connection between the battery pack 3 and the tool body, and meanwhile, the power device 1 is directly connected to the tool body.

As shown in FIG. 9, the tool control unit is provided with a forward/reverse rotation module, a turbo module 25, a brake module, and a speed regulation module 28. The function module is configured to transmit an operation instruction of a user, for converting an analog signal generated by operating the operation component into a digital signal, to the signal processing module 23. The signal processing module 23 processes the received operation instruction and transmits the received operation instruction to the tool control module 21. The tool control module 21 transmits the received operation instruction to the communication module 14 through the communication module 27. The power control module 11 receives the operation instruction transmitted by the communication module 14 and drives, through the motor drive module 12, the motor 13 to realize the functions of forward/reverse rotation, brake or speed conversion.

In an embodiment of the present invention, the operation instruction includes a safety instruction and a manipulation instruction, where the safety instruction is a safety brake instruction, and the manipulation instruction includes a forward/reverse rotation instruction, a Turbo instruction and a speed regulation instruction. When the operation instruction including the manipulation instruction and the safety brake instruction is transmitted from the tool control module 21 to the power control module 11, the safety instruction is preferentially transmitted. For example, when a user simultaneously generates a forward rotation instruction and a safety brake instruction through the operation component, the forward rotation instruction and the safety brake instruction are transmitted to the signal processing module 23 for processing. After the tool control module 21 detects the forward rotation instruction and the safety brake instruction, they are transmitted to the communication module 27, and the communication module 27 preferentially transmits the safety brake instruction to ensure the safety of the user.

As will be appreciated by those skilled in the art, when the safety instruction and the manipulation instruction are transmitted in parallel from the tool control module 21 to the power control module 11, the safety instruction is prioritized. For example, when the user simultaneously generates a forward rotation instruction and a safety brake instruction through the operation component, the forward rotation operation instruction and the safety brake instruction are processed by the signal processing module 23 and transmitted to the tool control module 21, the tool control module 21 transmits the forward rotation instruction and the safety brake instruction to the communication module 27, the communication module 27 converts the forward rotation instruction and the safety brake instruction into control parameters respectively and transmits the control parameters to the communication module 14 in parallel, and after receiving the two control instructions, the power control module 11 prioritizes the safety brake instruction, that is, the tool is preferentially controlled to safely brake to ensure the safety of the user.

It should be noted that prioritizing the instruction or the safety instruction transmitted by the battery pack 3 in the foregoing eighth embodiment of the present invention is mainly embodied as preferentially addressing the instruction or the safety instruction of the battery pack 3. After the power device 1 receives the control instruction transmitted by the battery pack 3 and the control instruction transmitted by the tool body 2, the control instruction transmitted by the battery pack 3 is preferentially addressed in the power control unit. When the battery pack 3 works normally, the power device 1 preferentially addresses the safety instruction. Prioritizing the instruction or the safety instruction transmitted by the battery pack in the foregoing seventh embodiment is mainly embodied as preferentially reading the instruction or the safety instruction of the battery pack 3. When the battery pack 3 transmits a control instruction to the tool body 2, the tool control unit in the tool body aggregates the control instruction transmitted by the battery pack and a control instruction generated in the tool body 2 and then transmits the two control instructions to the power control unit together, the power control unit preferentially reads the control instruction transmitted by the battery pack 3. When the battery pack 3 works normally, the power device 1 preferentially reads the safety instruction, so that the motor can be stopped in time to ensure the safety of the user. Prioritizing the instruction or the safety instruction transmitted by the battery pack in the present invention is further embodied as preferentially executing the control instruction or the safety instruction transmitted by the battery pack 3. The power control unit of the present invention has a program block, the program block has a default value, and the power control unit receives a control parameter transmitted by the tool control unit and writes the control parameter to the default value to form a complete program block to control the motor. The power control unit has a plurality of program blocks, and default values in the plurality of program blocks respectively receive the control parameter transmitted by the tool control unit and the control parameter transmitted by the battery pack 3 to form a complete program, where the plurality of program blocks is preset with a priority, and the control instruction transmitted by the battery pack 3 is preferentially executed. When the battery pack 3 works normally, the power control unit preferentially executes the safety instruction.

In another embodiment of the present invention, if the operation component simultaneously generates a plurality of manipulation instructions, a plurality of operation instructions is pre-ranked by priority, the plurality of operation instructions generated by the operation component is processed by the signal processing module 23 and then transmitted to the communication module 27 through the tool control module 21, and the communication module 27 sequentially transmits the plurality of manipulation instructions to the power control module 11 in descending order of priority. Preferably, the power control unit and the tool control unit transmit a manipulation instruction through a serial port. For example, when a user simultaneously generates a forward rotation instruction and a Turbo instruction through the operation component, the forward rotation instruction and the Turbo instruction are processed by the signal processing module 23 and then transmitted to the communication module 27 through the tool control module 21, the communication module 27 preferentially transmits the forward instruction to the power control module 11 in an order of the forward rotation instruction and the Turbo instruction according to a priority preset by serial transmission (for example, the priority of the forward rotation instruction is higher than that of the Turbo instruction), and then transmits the Turbo instruction, and the power control module 11 controls the motor 13 to rotate forward and then regulate the speed.

In the foregoing embodiment, the control parameter is transmitted between the tool control unit and the power control unit by means of serial communication, and the transmission of the communication parameter by means of serial communication may save communication terminals and save costs. It should be noted here that the control parameter may also be transmitted between the tool control unit and the power control unit by wireless transmission or other communication modes.

In another embodiment of the present invention, the user controls the working component to perform a corresponding operation through the operation component, the operation instruction generated by the operation component is converted into a control parameter according to a standard communication protocol by the tool control unit and transmitted to the power control unit, and the power control unit controls the motor 13 according to the received control parameter. Therefore, one power device may be adapted to different tool bodies to identify operation instructions generated by operation components of different tool bodies, thus controlling a motor.

For example, the tool control unit pre-stores control parameters corresponding to each operation instruction according to a certain communication protocol. For example, a forward rotation instruction corresponds to 001, a reverse rotation instruction corresponds to 002, a Turbo instruction corresponds to 003, and a brake instruction corresponds to 004. The power control unit pre-stores operation instructions corresponding to various control parameters according to a communication protocol. For example, 001 corresponds to a forward rotation instruction, 002 corresponds to a reverse rotation instruction, 003 corresponds to a Turbo instruction, and 004 corresponds to a brake instruction. When the user triggers a forward/reverse rotation switch to make the motor 13 to rotate forward, the function module generates a forward rotation instruction, which is processed by the signal processing module 23 and transmitted to the tool control module 21, the tool control module 21 transmits the received operation instruction to the communication module 27, the communication module 27 converts the instruction into a control parameter 001 according to a communication protocol, and transmits 001 to the power control module 11 by serial communication, and the power control module 11 receives the instruction 001 and converts the instruction 001 into a corresponding forward rotation instruction according to the communication protocol to control the motor 13 to rotate forward. When the user triggers a Turbo switch, the function module generates a Turbo instruction, which is processed by the signal processing module 23 and transmitted to the tool control module 21, the tool control module 21 transmits the detected Turbo instruction to the communication module 27, the communication module 27 converts the instruction into a control parameter 003 according to a communication protocol, and transmits 003 to the communication module 14 by serial communication, and the communication module 14 receives the instruction 003, converts the instruction 003 into a corresponding Turbo instruction according to the communication protocol, and transmits the Turbo instruction to the power control module 11 to control the motor 13 to rotate at a maximum speed. The transmission process of other instructions is the same as that of the forward rotation instruction and the Turbo instruction.

Figure 11:
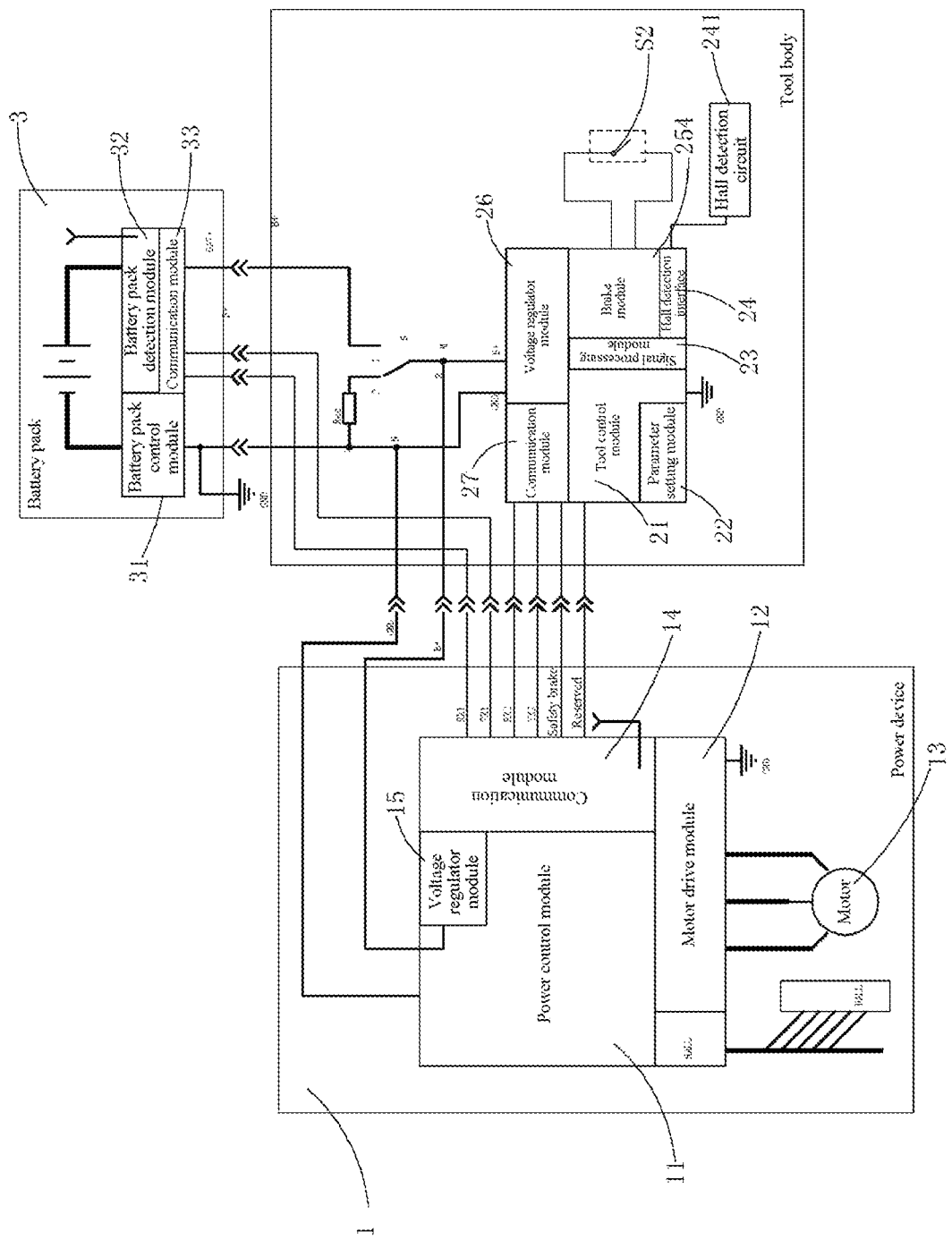
FIG. 11 is a schematic circuit structure diagram of the chain saw according to the second embodiment of the present invention.

Referring to FIG. 9 and FIG. 11, the forward/reverse rotation instruction, the speed regulation instruction and the Turbo instruction are transmitted by the communication module 27 of the tool body to the communication module 14 of the power device through a digital signal by means of serial transmission. Referring to FIG. 9 and FIG. 11, the tool body and the power device 1 are provided with communication terminals for transmitting a safety brake instruction, that is, the safety brake instruction is transmitted to the communication terminal of the power device 1 through the communication terminal of the tool body by means of an analog signal. Specifically, the safety brake switch is triggered, a level signal is transmitted to the tool control module 21 after being processed by the signal processing module 23, the tool control module 21 detects the level signal and directly transmits the level signal to the power control module 11, and the power control module 11 receives the level signal to control the motor to brake. In the foregoing embodiment, the safety brake instruction is transmitted by the analog signal, and the transmission and the response are faster, so that the motor can brake in time.

Preferably, the safety brake instruction of the present invention may also be transmitted to the communication module 14 of the power device 1 from the communication module 27 of the tool body by means of serial transmission through a digital signal in addition to being transmitted to the control terminal of the power device 1 from the control terminal of the tool body through the analog signal. Therefore, the safety brake instruction is transmitted through both the analog signal and the digital signal, thereby ensuring that the power device 1 may receive the safety brake instruction in time to control the motor 13 to brake.

In another embodiment of the present invention, a control parameter is transmitted between the power control module 11 and the tool control module 21, where the control parameter further includes state information of the motor 13, protection parameter information, current information of the motor 13, and a switching signal, which are fed back to the tool control unit by the power control module 11.

In another embodiment of the present invention, a wireless communication module is provided in the tool body, a wireless communication module is provided in the power device 1, and the tool control module 21 and the power control module 11 wirelessly communicate through the wireless communication module. Specifically, the tool control module 21 sends a tool parameter to the power control module 11 through the communication module 27, and the wireless communication module of the power control module 11 receives the parameter, and configures parameters of the motor 13 according to the parameter to drive the start and the motor 13.

It should be noted that the tool control module 21 may wirelessly communicate with peripheral equipment. Specifically, the tool control module 21 sends the tool parameter to the peripheral equipment through the wireless communication module, so that the user can understand the basic situation and abnormal information of the tool, which is convenient for use and maintenance of the tool.

It should be noted that the power control module 11 may wirelessly communicate with peripheral equipment. Specifically, the power control module 11 transmits information such as the model and usage of the motor 13 to the peripheral equipment through the wireless communication module, so that the user can know the usage of the motor 13 in time for timely repair and maintenance.

In another embodiment of the present invention, the tool control unit is further has a Hall detection interface 24, which is connected to a Hall detection board for detecting whether the power device 1 and the tool body are locked. When the battery pack 3 is mounted on the tool body and the power device 1 is mounted on the tool body, the power switch S1 is closed, a Hall detection circuit 241 in the Hall detection board detects a distance between the power device 1 and the tool body, and transmits a distance signal to the signal processing module 23 in the tool control unit, the distance signal is transmitted to the tool control module 21 after being processed by the signal processing module 23, and the tool control module 21 determines a relationship between the distance signal and a preset distance in the tool control module 21. If the distance is within a preset distance range, it is indicated that the tool body and the power device 1 have been successfully mated, and the tool control module 21 transmits configuration parameters in the parameter setting module 22 to the power control module 11 in the power device 1, and updates parameters in the power control module 11. In one embodiment, the parameters in the parameter setting module 21 are transmitted by the tool control unit to the power control unit by means of serial communication. In another embodiment, the parameters in the parameter setting module 21 are transmitted from the tool control unit to the power control unit by means of wireless transmission. If the tool control module 21 determines that the distance is not within the preset distance range, the tool control module 21 does not transmit a start instruction to the power control module 11, and the motor 13 is not started, the parameters in the parameter setting module including a tool protection parameter, a start parameter, a brake parameter, a shutdown parameter, a function parameter, etc. As will be appreciated by those skilled in the art, the Hall detection interface 24 may also be provided on the power control unit.

When the power device 1 is not connected to the tool body or when the power device 1 is connected to the tool body but the electric tool is not started or after the power device 1 is connected to the tool body and the electric tool is started, the user may update the parameters in the power control module 11 in the power device 1. Staff may update the parameters in the power control module 11 to make the output power, rotating speed or steering of the motor of the power module 1 consistent with the power, rotating speed or steering of the connected tool body, thereby controlling the connected tool body to work in an ideal state. As will be appreciated by those skilled in the art, the tool control module 21 may transmit the configuration parameters to the power control module 11 by means of wireless communication, or other communication modes such as serial communication, RS485, CP243, etc.

In another embodiment of the present invention, signal transmission is performed between the battery pack 3 and the power device 1. Specifically, parameter information in the battery pack 3 is transmitted to the power control module 11 by the battery pack control module 31 by means of serial communication. The parameter includes a protection parameter of the battery pack 3, specifically including a battery pack temperature, a single battery pack voltage, an entire pack voltage and other parameters. The power control module 11 controls the discharge process of the battery pack 3 according to the parameter of the battery pack, that is, allows the battery pack 3 to supply electric energy to the motor or prohibits the battery pack 3 from supplying electric energy to the motor. As will be appreciated by those skilled in the art, the battery pack control module 31 and the power control module 11 may perform signal transmission by means of wireless communication.

It should be noted that a battery pack is provided with a wireless communication module, and the battery pack 3 may wirelessly communicate with peripheral equipment. Specifically, the battery pack control module 31 sends relevant parameters of the battery pack to the peripheral equipment through the wireless communication module, so that the user can understand the basic situation and abnormal information of the battery pack 3.

Figure 10:
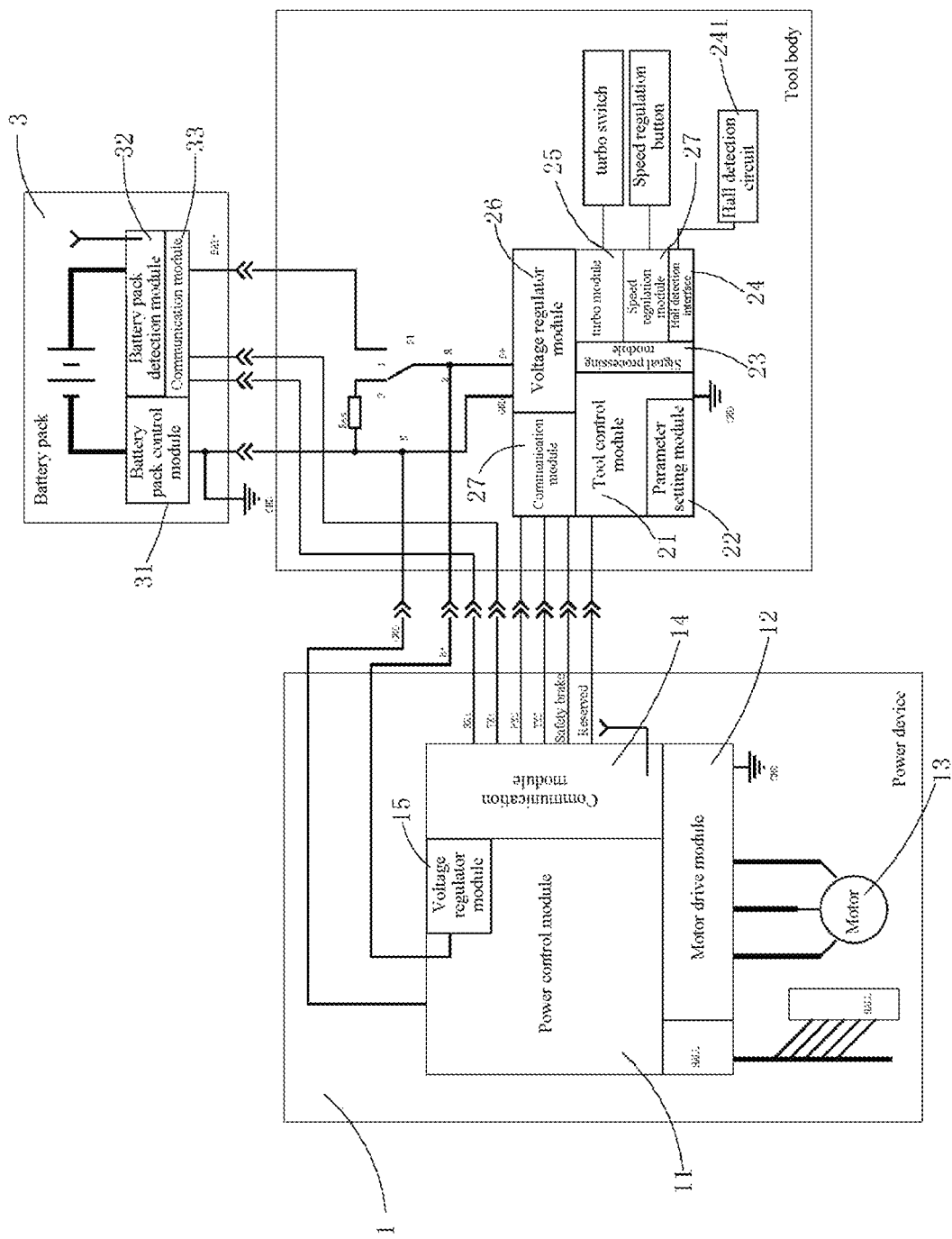
FIG. 10 is a schematic circuit structure diagram of the blower according to the first embodiment of the present invention.

FIG. 10 is a schematic circuit structure diagram of the blower according to the first embodiment of the present invention. The power device 11 and the battery pack 3 are mounted on a blower body for cleaning leaves or garbage scattered on the garden or the street. A start switch corresponds to the power switch S1 in FIG. 10. The power switch S1 is closed, the Hall detection circuit 241 detects a distance between the power device 1 and the blower body, and transmits a distance signal to the signal processing module 23 in the tool control unit, the distance signal is transmitted to the tool control module 21 after being processed by the signal processing module 23, and the tool control module 21 determines whether the distance signal is within a preset distance range. If the distance is within the preset distance range, the tool control module 21 transmits configuration parameters in the parameter setting module 22 to the power control module 11 in the power device 1, and updates a start parameter, a protection parameter and relevant function parameters in the power control module 11, and the tool control module 21 transmits a start instruction to the power control module 11 to start the motor 13. If the tool control module 21 determines that the distance signal is not within the preset distance range, the tool control module 21 does not transmit the start instruction to the power control module 11, and the motor 13 is not started, the parameters including a start parameter, a protection parameter, a function parameter, tool information confirmation, a basic running status parameter, a brake shutdown parameter, a function switching parameter, a gear shift parameter, a switching speed regulation parameter, etc.

In the foregoing embodiment, when the power device is changed from the grass trimmer, the lawnmower, the chain saw or other types of tool bodies originally adapted to the adapted blower body or when the model of the grass trimmer is changed, the power control unit receives parameters transmitted by the tool control unit to configure a start parameter, a protection parameter and relevant function parameters of the motor, etc., so that the motor can be normally started and protected, and can perform the corresponding functions to control the blower body to work in a relatively ideal state.

In the foregoing embodiment, the blower further includes a battery pack 3, the power control unit and the tool control unit are connected in parallel between the positive and negative electrodes of the battery pack 3, and the battery pack 3 supplies electric energy to the power control unit and the tool control unit respectively, where the electric energy of the battery pack 3 is transmitted to the power control unit through the blower body. The parameters and the manipulation instruction in the tool control unit are directly transmitted to the power control unit, and the parameter information of the battery pack 3 needs to be transmitted to the power control unit through the blower body.

In the present invention, the control parameter includes an operation instruction generated by an operation switch on the operation component through the user, and a preset parameter stored in the parameter setting module 22. The parameter setting module 22 is located in the tool control unit. When the tool body is connected to the power device, the power control module 11 may receive parameters transmitted by the parameter setting module 22 in the tool control unit, and may configure a start parameter, a protection parameter and relevant function parameters of the motor 13 according to the parameters provided by the parameter setting module 22. When the start switch is triggered, the tool control module 21 receives a start instruction generated by the start switch, converts the start instruction into a corresponding control parameter, and transmits the control parameter to the power control module 11. The power control module 11 controls the start of the motor 13 according to the start instruction, converts other relevant operation instructions of the user into corresponding control parameters by the tool control module 21, and transmits the control parameters to the power control module 11. The power control module 11 controls the motor 13 to control the working component to work. The operation instruction of the user includes a manipulation instruction, specifically including a speed regulation instruction and a Turbo instruction.

In the foregoing embodiment, the speed regulation instruction of the blower is triggered by a speed regulation knob. Specifically, the speed regulation knob on the handle of the blower has a total of five gears, which are shifted by a positioner. When the speed regulation knob rotates to different positions, different operation instructions are generated in correspondence to different gears, and the tool control module 21 transmits the operation instructions to the power control module 11 to control the motor 13 to operate at different rotating speeds, and thus the blower has different air speeds.

The blower body is further provided with a Turbo switch. When the Turbo switch is triggered, a Turbo instruction is generated. The Turbo instruction is transmitted to the power control unit by the tool control unit. The power control unit receives the Turbo instruction to control the motor 13 to operate at a TOP speed. The Turbo switch is loosened, and the power control unit controls the motor 13 to operate at an original speed. As will be appreciated by those skilled in the art, the speed regulation knob may also be set with three, six or more gears, which are not described one by one here.

Specifically, when the Turbo switch is triggered, the Turbo module 25 connected to the Turbo switch generates a corresponding Turbo instruction, which is processed by the signal processing module 23 and transmitted to the tool control module 21, the tool control module 21 transmits the Turbo instruction to the communication module 27, the communication module 27 converts the received Turbo instruction into a corresponding control parameter (003) according to a communication protocol, and transmits the control parameter (003) to the communication module 14, the communication module 14 converts the control parameter (003) into a Turbo instruction according to the communication protocol, and transmits the Turbo instruction to the power control module 11, and the power control module 11 adjusts PWM according to the received Turbo instruction to control the motor 13 to operate at a maximum speed.

When the speed regulation knob is triggered to rotate to a certain gear, the speed regulation module 28 connected to the speed regulation knob generates a corresponding rotating speed signal, which is processed by the signal processing module 23 and transmitted to the tool control module 21, the tool control module 21 transmits the instruction to the communication module 27, the communication module 27 converts the received rotating speed signal into a corresponding control parameter (for example, 006) according to a communication protocol, and transmits the control parameter (006) to the communication module 14 in the power device 1 by serial transmission, the communication module 14 in the power device 1 receives the control parameter, converts the control parameter into a rotating speed signal according to the communication protocol, and transmits the rotating speed signal to the power control module 11, and the power control module 11 adjusts PWM according to the received rotating speed signal to control the rotating speed of the motor 13, thereby achieving a speed regulation function. When the tool body is connected to the power device, the tool control unit may also perform signal transmission with the power control unit by means of wireless communication.

It should be noted that in another embodiment of the present invention, a potentiometer is provided in the speed regulation knob, and different positions of the potentiometer correspond to different voltages. The speed regulation knob is rotated to generate a corresponding voltage signal, which is transmitted to the signal processing module 23, processed by the signal processing module 23 and then transmitted to the tool control module 21, the tool control module 21 transmits the received voltage signal to the power control module 11, and the power control unit adjusts PWM according to the received voltage signal, controls the rotating speed of the motor, and realizes speed regulation. When the speed regulation knob is rotated to a certain position, the corresponding speed is zero. At this time, a voltage signal corresponding to the position is transmitted to the tool control module 21, the tool control module 21 transmits the received voltage signal to the power control module 11, and the power control module 11 adjusts PWM according to the voltage signal to control the motor to stop. Therefore, the blower in the present invention may not only control the motor to stop by a digital signal, but also control the motor to stop by an analog signal.

In the foregoing embodiment, the blower tool control unit may transmit both a digital signal and an analog signal. It should be noted that the tool control unit may not only transmit a control parameter generated by a user operation to the power control unit, but also transmit use information of the blower body to peripheral equipment by means of wireless communication, so that the user can understand the basic situation and abnormal information of the blower body for convenience of use and maintenance of the blower body. Preferably, the peripheral equipment may reconfigure/modify the parameters in the parameter setting module 22 in the tool control unit by means of wireless communication, thereby realizing the configuration/modification of the parameters in the power control unit by configuring/modifying the parameters in the tool control unit. As will be appreciated by those skilled in the art, the power control unit may wirelessly communicate with the peripheral equipment, so that the user can understand the basic information and abnormal information of the motor 13 for convenience of use and maintenance of the motor 13. The power control unit may also feedback a signal such as the state of the motor 13, the protection state and the current to the tool control unit in the blower body for convenience of better control over the working component. Preferably, the battery pack 3 may perform signal transmission with the power control unit, and parameter information in the battery pack 3 is transmitted to the power control unit by means of serial communication. The parameter information of the battery pack 3 may be further transmitted to peripheral equipment by means of wireless communication, so that the user can understand the use information of the battery pack 3.

FIG. 11 shows a schematic circuit structure diagram of a chain saw. The power device 1 and the battery pack 3 are mounted on a chain saw body, the power switch S1 is closed, the Hall detection circuit 241 detects a distance between the power device 1 and the chain saw body 2, and transmits a distance signal to the signal processing module 23 in the tool control unit, the distance signal is transmitted to the tool control module 21 after being processed by the signal processing module 23, and the tool control module 21 determines whether the distance signal is within a preset distance range. If the distance is within the preset distance range, the tool control module 21 transmits configuration parameters in the parameter setting module 22 to the power control module 11 in the power device 1, and updates parameters in the power control module 11, and the motor 13 is started. If the tool control module 21 determines that the distance signal is not within the preset distance range, the power control module 11 cannot obtain the configuration parameters in the tool control module 21, and the motor 13 is not started, the parameters including a start parameter, a protection parameter, a function parameter, tool information confirmation, a basic running status parameter, a brake shutdown parameter, a function switching parameter, a gear shift parameter, a switching speed regulation parameter, etc.

A chain saw operation component is provided with a safety brake switch S2 for quickly controlling the motor 13 to brake. When the user pulls the protective plate forward, the safety brake switch S2 is driven to be triggered, and a safety brake module 254 connected to the safety brake switch S2 generates a corresponding safety brake signal, which is processed by the signal processing module 23 and then transmitted to the power control module 11 to control the motor 13 to quickly brake. Preferably, the chain saw of the present invention is further provided with a brake alarm device, which is provided in the tool control unit in the chain saw body. The safety brake switch S2 simultaneously controls the start of the alarm device. When braking, the safety brake switch S2 is started, a safety brake signal generated by the safety brake switch S2 is transmitted to the tool control module 21, the tool control module 21 controls the alarm device to initiate an alarm, and meanwhile, the tool control module 21 transmits the safety brake signal to the power control module 11 to achieve the purpose of quick braking.

Specifically, the safety brake switch S2 is triggered. At this time, a brake circuit is started, and three-phase coils of the motor 13 are all short-circuited, which is equivalent to turning on a reverse circuit. A rotor of the motor 13 continues to rotate at a high speed due to inertia. At this time, as a generator, the motor converts inertia-operated motor kinetic energy into electric energy which is released quickly to generate a reverse torque for preventing the inertial operation of the rotor, thus achieving quick braking of the chain saw. When an emergency stop is required, the three-phase coils of the motor 13 are simultaneously short-circuited by switching the on state of the safety brake switch S2, so that the motor 13, as a generator, converts inertial motor kinetic energy into electric energy which is released quickly to provide a larger reverse braking torque, thus achieving an emergency brake. Compared with mechanical brakes, the problem of accidental personal injury to a user caused by long anti-kick braking time is resolved. Compared with ordinary electronic brakes, the three-phase coils are simultaneously short-circuited, which can provide a larger braking torque and shorten the braking time. After calculation, the braking time may be shortened to be less than 0.1 second.

As shown in FIG. 11, the tool body and the power device 1 are provided with communication terminals for transmitting a safety brake instruction, that is, the safety brake instruction is transmitted to the communication terminal of the power device 1 through the communication terminal of the tool body by means of an analog signal. Specifically, the safety brake switch is triggered, a level signal is transmitted to the tool control module 21 after being processed by the signal processing module 23, the tool control module 21 detects the level signal and directly transmits the level signal to the power control module 11, and the power control module 11 receives the level signal to control the motor to brake. In the foregoing embodiment, the safety brake instruction is transmitted by the analog signal, and the transmission and the response are faster, so that the motor can brake in time.

In the foregoing embodiment, the tool control unit of the chain saw may not only transmit a control parameter to the power control unit, but also transmit use information of the tool to peripheral equipment by means of wireless transmission, so that the user can understand the basic situation and abnormal information of the tool for convenience of use and maintenance of the tool. Preferably, the peripheral equipment may reconfigure the parameters in the parameter setting module in the tool control unit by means of wireless transmission, thereby realizing the configuration of the parameters in the power control unit by configuring the parameters in the tool control unit. The battery pack may perform signal transmission with the power control unit, and parameter information in the battery pack is transmitted to the power control unit by means of serial communication. The parameter information of the battery pack may be further transmitted to peripheral equipment by means of wireless transmission, so that the user can understand the use information of the battery pack.

Figure 12:
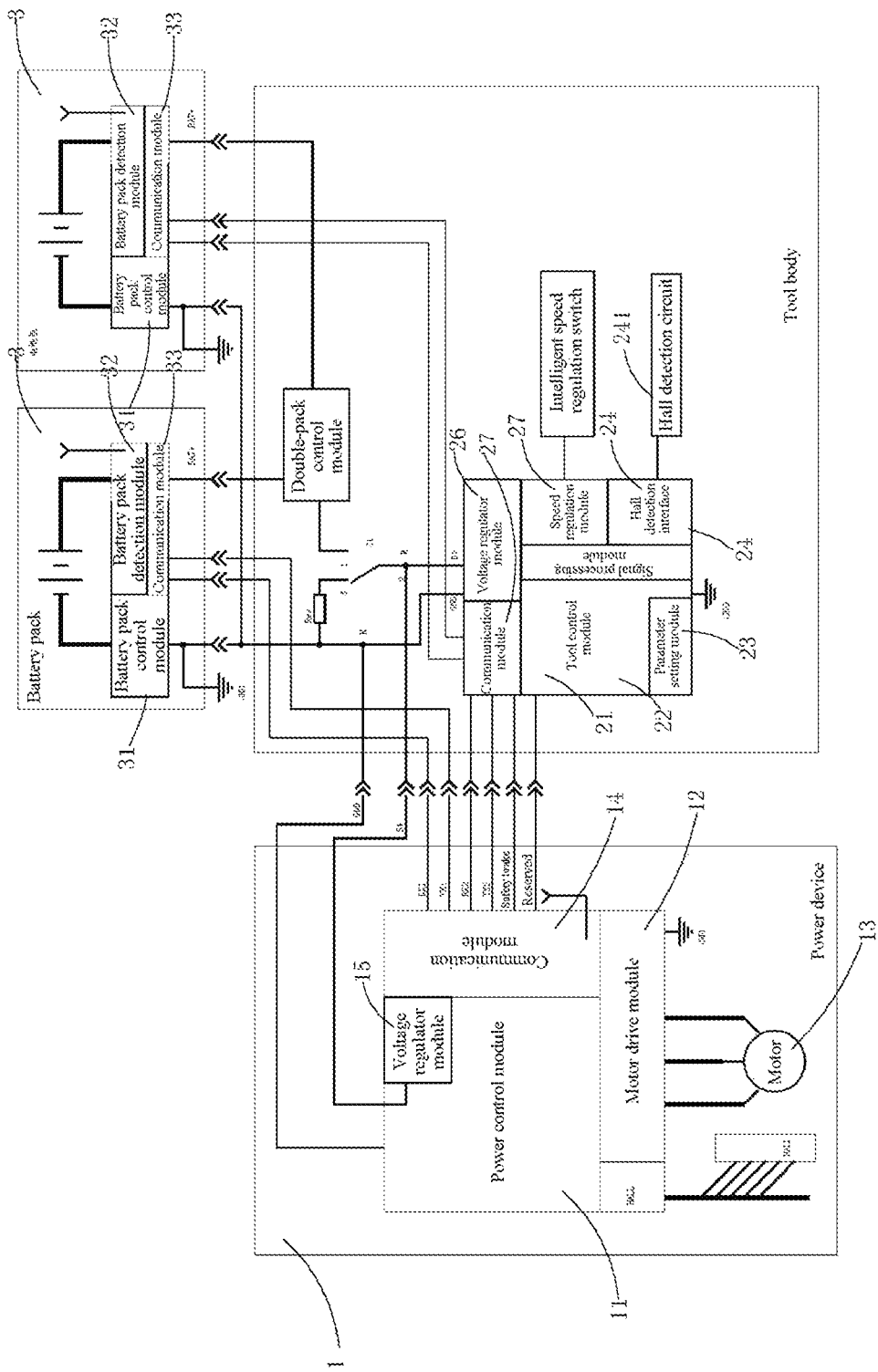
FIG. 12 is a schematic circuit structure diagram of the pruning shear according to the third embodiment of the present invention.

FIG. 12 shows a schematic circuit structure diagram of a pruning shear. The power device 1 and the battery pack 3 are mounted on a pruning shear body and configured to cut various shrubs and hedges. The power switch S1 is closed, the Hall detection circuit 241 detects a distance between the power device 1 and the grass trimmer body, and transmits a distance signal to the signal processing module 23 in the tool control unit, the distance signal is transmitted to the tool control module 21 after being processed by the signal processing module 23, and the tool control module 21 determines whether the distance signal is within a preset distance range. If the distance is within the preset distance range, the tool control module 21 transmits configuration parameters in the parameter setting module 22 to the power control module 11 in the power device 1, and updates parameters in the power control module 11, and the tool control module 21 transmits a start instruction to the power control module 11 to start the motor 13. If the tool control module 21 determines that the distance signal is not within the preset distance range, the tool control module 21 does not transmit the start instruction to the power control module 11, and the motor 13 is not started, the configuration parameters including a start duty ratio, an over-current protection parameter, an initial rotating speed of the motor 13, a commutation mode, etc.

A pruning shear operation component is provided with an anti-stalling switch for preventing the pruning shear from being stalled. When it is detected that the pruning shear is stalled and the anti-stalling switch is triggered, the power control module 11 controls the motor 13 to rotate reversely for a preset time. If it is continuously detected that the pruning shear is stalled and the switch is triggered again, the power control unit controls the motor 13 to rotate forward for a preset time. The operation is performed alternately until a cutter head is no longer stuck. Specifically, as shown in FIG. 16, when it is detected that the pruning shear is stalled and the anti-stalling switch is triggered, an anti-stalling module 29 corresponding to the anti-stalling switch generates a reverse rotation instruction to be transmitted to the signal processing module 23, the reverse rotation instruction is processed by the signal processing module 23 and transmitted to the tool control module 21, the tool control module 21 receives the reverse rotation instruction and transmits the reverse rotation instruction to the communication module 27, the communication module 27 converts the reverse rotation instruction into a control parameter (002) according to a preset communication protocol and transmits the control parameter (002) to the communication module 14, and the communication module 14 receives the control parameter (002), converts the control parameter (002) into a corresponding reverse rotation instruction according to the preset communication protocol, and transmits the corresponding reverse rotation instruction to the power control module 11 to control the motor 13 to rotate reversely for a preset time. If it is continuously detected that the pruning shear is stalled, the anti-stalling switch is triggered again, the anti-stalling module 29 corresponding to the anti-stalling switch generates a forward rotation instruction to be transmitted to the signal processing module 23, the forward rotation instruction is processed by the signal processing module 23 and transmitted to the tool control module 21, the tool control module 21 receives the forward rotation instruction and transmits the forward rotation instruction to the communication module 27, the communication module 27 converts the forward rotation instruction into a control parameter (001) according to the preset communication protocol and transmits the control parameter (001) to the communication module 14, and the communication module 14 receives the control parameter (001), converts the control parameter (001) into a corresponding forward rotation instruction according to the preset communication protocol, and transmits the forward rotation instruction to the power control module 11 to control the motor 13 to rotate forward for a preset time.

In the foregoing embodiment, the pruning shear adopts a two-stage speed regulation mode, including mechanical speed reduction and electronic speed reduction. The mechanical speed reduction performs speed reduction by using a speed reduction mechanism including a transmission shaft, a gear seat sleeved on the transmission shaft, a motor 13, and a transmission speed reduction mechanism connected between an output shaft of the motor 13 and a blade. A rotation motion of the motor 13 is transformed into a reciprocating cutting action of the blade by a transmission mechanism, the gear seat is in fit connection with the transmission speed reduction mechanism through a clutch mechanism, and the clutch mechanism makes a transmission chain separated after being stuck by a hard object during the operation of the mechanism to ensure the safety of the motor 13 and the overall operation. The transmission speed reduction mechanism includes a primary gear, a secondary gear meshed with the primary gear, and a tertiary gear meshed with the output shaft of the motor 13, where the number of teeth of the primary gear, the secondary gear, the tertiary gear and the output shaft is sequentially reduced, and the motor 13 is in transmission connection with the blade through the output shaft, the tertiary gear, the secondary gear, the primary gear, the gear seat and the clutch mechanism sequentially. The present invention performs speed reduction by the primary gear, the secondary gear and the tertiary gear of which the number of gears is progressively decreased. For the electronic speed reduction of the present invention, specifically, the power control unit changes the duty ratio of an output signal, and PWM determines to be output to an average voltage of a DC motor 13, thereby achieving the purpose of adjusting the rotating speed of the DC motor 13 within a wide range.

In the foregoing embodiment, the tool control unit in the pruning shear may not only transmit a control parameter to the power control unit, but also transmit use information of the tool to peripheral equipment by means of wireless communication, so that the user can understand the basic situation and abnormal information of the tool for convenience of use and maintenance of the tool. Preferably, the peripheral equipment may reconfigure the parameters in the parameter setting module in the tool control unit by means of wireless transmission, thereby realizing the configuration of the parameters in the power control unit by configuring the parameters in the tool control unit. The battery pack may perform signal transmission with the power control unit, and parameter information in the battery pack is transmitted to the power control unit by means of serial communication. The parameter information of the battery pack may be further transmitted to peripheral equipment by means of wireless communication, so that the user can understand the use information of the battery pack.

Figure 13:
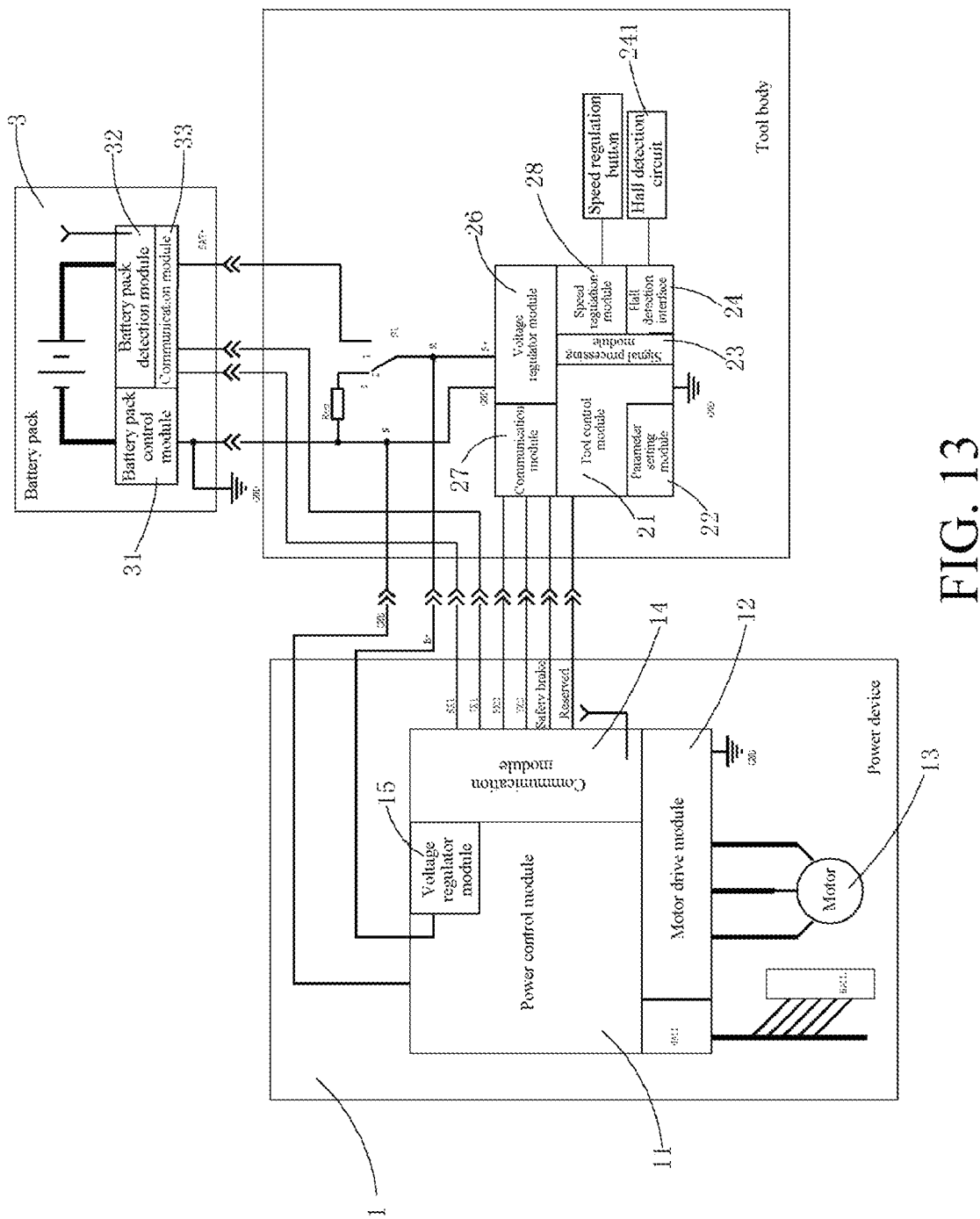
FIG. 13 is a schematic circuit structure diagram of the lawnmower according to the fourth embodiment of the present invention.

FIG. 13 shows a schematic circuit structure diagram of a lawnmower. The power device 1 and the battery pack 3 are mounted on a lawnmower body. The power switch S1 is closed, the Hall detection circuit 241 detects a distance between the power device 1 and the lawnmower body, and transmits a distance signal to the signal processing module 23 in the tool control unit, the distance signal is transmitted to the tool control module 21 after being processed by the signal processing module 23, and the tool control module 21 determines whether the distance signal is within a preset distance range. If the distance is within the preset distance range, the tool control module 21 transmits configuration parameters in the parameter setting module 22 to the power control module 11 in the power device 1, and updates parameters in the power control module 11, and the tool control module 21 transmits a start instruction to the power control module 11 to start the motor 13. If the tool control module 21 determines that the distance signal is not within the preset distance range, the tool control module 21 does not transmit the start instruction to the power control module 11, and the motor 13 is not started, the configuration parameters including a start duty ratio, an over-current protection parameter, an initial rotating speed of the motor 13, a commutation mode, etc.

The lawnmower is provided with two battery pack holders for respectively allowing a first battery pack and a second battery pack to be mounted, and the first battery pack and the second battery pack supply electric energy to the power device 1 and the lawnmower body in parallel. A user control circuit is provided in the lawnmower body for selecting the first battery pack or the second battery pack to supply power or the first battery pack and the second battery pack to simultaneously supply power. Preferably, a double-pack control module is a relay, the first battery pack and the second battery pack are separately connected to the power control module 11 through the relay, and the relay is configured to separately control the on and off of electric energy transmission of the first battery pack and the second battery pack, where the relay controls the on and off of electric energy transmission of the first battery pack and the second battery pack according to whether the first battery pack and the second battery pack satisfy a preset condition, where the preset condition includes any one of the conditions that the temperature of the first battery pack or the second battery pack reaches a preset value or the voltage reaches a preset value. Specifically, the circuit of the present invention is further provided with a voltage detection module for detecting voltages of the first battery pack and the second battery pack. A positive electrode of the first battery pack is connected to one end of the first voltage detection module, a positive electrode of the second battery pack is connected to one end of the second voltage detection module, the other end of the first voltage detection module and the second voltage detection module are connected to one end of the relay respectively, the other end of the relay is connected to the tool control unit and the power switch separately, and a negative electrode of the first battery pack and a negative electrode of the second battery pack are connected in parallel to a ground end of the lawnmower body and a ground end of the power device 1, respectively, to form a closed circuit. When two battery packs are mounted on the lawnmower body, the power switch is closed, the voltage detection module detects the voltages of the two battery packs, and transmits the detection result to the tool control module 21, the tool control module 21 determines whether a voltage difference between the two battery packs 3 exceeds a preset value, and if not, the relay controls electric energy transmission circuits of the two battery packs 3 to be turned on to supply electric energy to the power device 1 and the lawnmower body. If so, the relay controls the electric energy transmission circuit of the battery pack 3 having a high voltage to be turned on to supply electric energy to the power device 1 and the lawnmower body.

In the present invention, the lawnmower adjusts the rotating speed of the motor 13 by means of intelligent speed regulation. The power control unit of the lawnmower includes a current detection module for detecting the current of the motor 13, the current detection module transmits the detected current to the power control module 11, the power control module 11 compares the received current value with a preset current value pre-stored in the power control module 11, if the detected current value is greater than the preset current value, the power control module 11 controls PWM to increase, and controls the rotating speed of the motor 13 to increase, and when the current is less than the preset value, the power control module controls PWM to decrease, and controls the rotating speed of the motor 13 to decrease.

In the foregoing embodiment, the tool control unit in the lawnmower may not only transmit a control parameter to the power control unit, but also transmit use information of the tool to peripheral equipment by means of wireless communication, so that the user can understand the basic situation and abnormal information of the tool for convenience of use and maintenance of the tool. Certainly, the peripheral equipment may reconfigure the parameters in the parameter setting module in the tool control unit by means of wireless transmission, thereby realizing the configuration of the parameters in the power control unit by configuring the parameters in the tool control unit. As will be appreciated by those skilled in the art, the control unit may not only transmit parameters in the control unit to the tool control unit, but also transmit the use situation and abnormal information of the motor to the peripheral equipment by means of wireless communication. The peripheral equipment may configure parameters in the tool control unit by means of wireless transmission. The battery pack may perform signal transmission with the power control unit, and parameter information in the battery pack is transmitted to the power control unit by means of serial communication. The parameter information of the battery pack may be further transmitted to peripheral equipment by means of wireless communication, so that the user can understand the use information of the battery pack.

In the present invention, a double-pack control module is further included for selecting at least one battery pack to work when a plurality of battery packs 3 supplies power. The double-pack control module in the present invention includes a relay.

As an independent power body, the power device 1 needs to resolve the safety problems caused by its operation. In the present invention, the circuit arrangement and the electrical connection between the power device 1 and the tool body ensure that the power device 1 does not work when the power device 1 is independently arranged, and the work can be started only when the power device 1 is mounted on the tool body, thereby avoiding the safety problems caused by the power device 1 as an independent power body.

Figure 14:
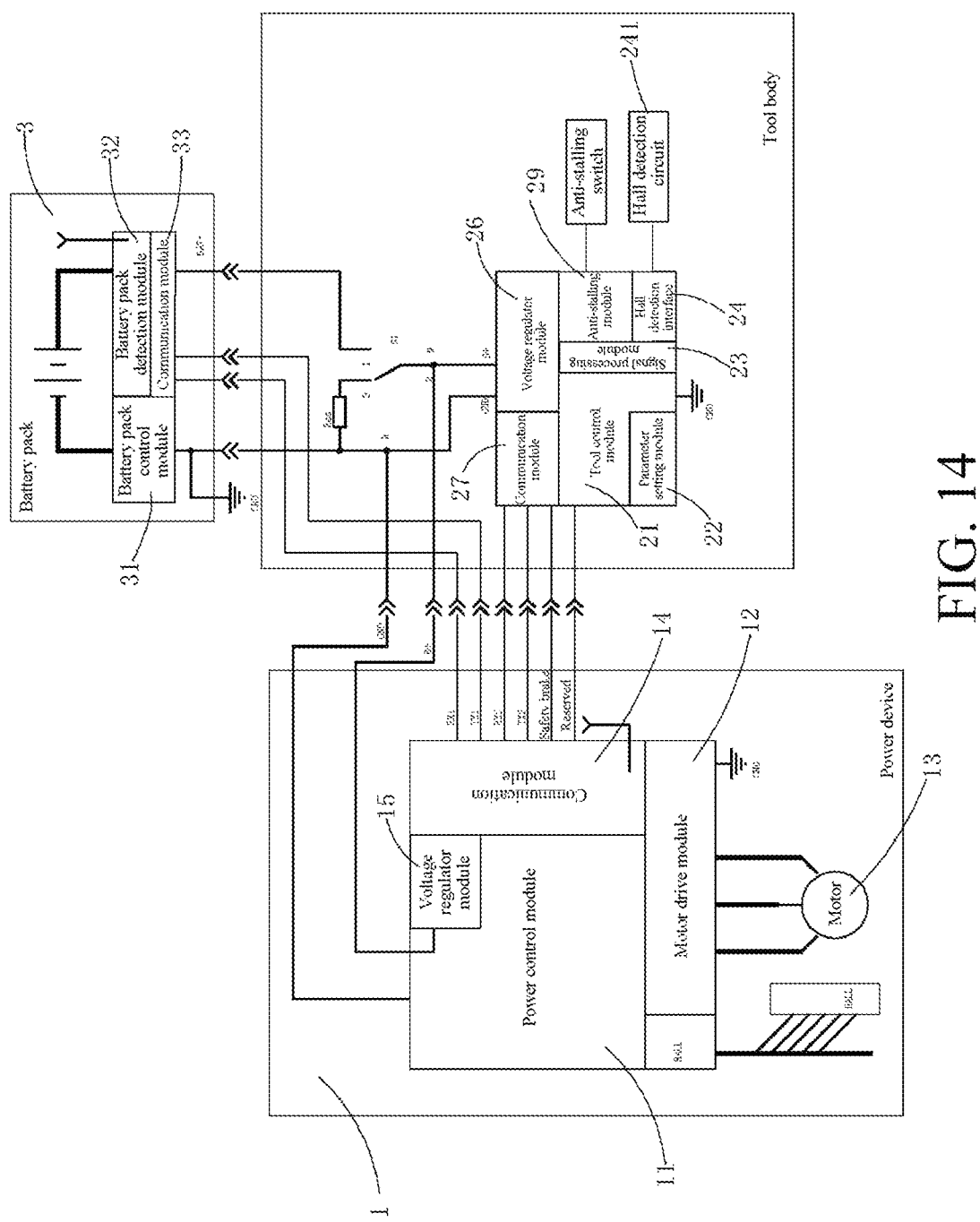
FIG. 14 is a schematic circuit structure diagram of the grass trimmer according to the fifth embodiment of the present invention.

FIG. 14 shows a schematic circuit structure diagram of a grass trimmer. The power device 1 and the battery pack 3 are mounted on a grass trimmer body for cutting weeds in lawns, gardens, pastures, etc. The power switch S1 is closed, the Hall detection circuit 241 detects a distance between the power device 1 and the grass trimmer body, and transmits a distance signal to the signal processing module 23 in the tool control unit, the distance signal is transmitted to the tool control module 21 after being processed by the signal processing module 23, and the tool control module 21 determines whether the distance signal is within a preset distance range. If the distance is within the preset distance range, the tool control module 21 transmits configuration parameters in the parameter setting module 22 to the power control module 11 in the power device 1, and updates parameters in the power control module 11, and the tool control module 21 transmits a start instruction to the power control module 11 to start the motor 13. If the tool control module 21 determines that the distance signal is not within the preset distance range, the tool control module 21 does not transmit the start instruction to the power control module 11, and the motor 13 is not started, the configuration parameters including a start duty ratio, an over-current protection parameter, an initial rotating speed of the motor 13, a commutation mode, etc.

The grass trimmer of the present invention has a speed regulation function. The grass trimmer body is provided with a speed regulation knob, and a user can select high and low speed gears according to the needs. When the start switch of the grass trimmer is triggered and the speed regulation knob rotates to a low speed gear, the speed regulation module 28 corresponding to the low speed gear generates a low speed instruction to be transmitted to the signal processing module 23, the received low speed instruction is processed by the signal processing module 23 and transmitted to the tool control module 21, the tool control module 21 transmits the low speed instruction to the communication module 27, the communication module 27 converts the signal into a corresponding control parameter (for example, 007) according to a communication protocol, and transmits the control parameter (007) to the communication module 14 in the power device 1 by serial transmission, the communication module 14 receives the control parameter (007), converts the control parameter (007) into a low speed instruction according to the communication protocol, and transmits the low speed instruction to the power control module 11, and the power control module 11 adjusts PWM according to the received low speed instruction to control the motor 13 to rotate at a lower speed, thereby achieving the speed regulation function. When the speed regulation button is in a high speed gear, the signal transmission mode is the same as that of the low speed gear, which will not be described in detail here.

The lawnmower of the present invention has a turbo switch for controlling the motor 13 to rotate at a maximum speed, and when the turbo switch is released, the motor 13 rotates at a normal speed. Specifically, when the turbo switch is triggered, the turbo module 25 connected to the turbo switch generates a corresponding turbo instruction, which is processed by the signal processing module 23 and transmitted to the communication module 27, the communication module 27 converts the received turbo instruction into a corresponding control parameter (003) according to a communication protocol, and transmits the control parameter (003) to the communication module 14 in the power device 1 by means of a serial port, the communication module 14 receives the control parameter (003), converts the control parameter (003) into a turbo instruction according to the communication protocol, and transmits the turbo instruction to the power control module 11, and the power control module 11 adjusts PWM to the maximum value according to the received turbo instruction to control the motor 13 to rotate at a maximum speed, thereby achieving the speed regulation function.

It should be noted that an analog signal may also be transmitted between the tool control unit and the power control unit, such as the speed regulation instruction and the turbo instruction in the foregoing embodiment. Corresponding to different degrees of pressing of the speed regulation switch, different voltage signals are output, and are transmitted to the power control unit by the tool control unit, and the power control unit receives the voltage signal and adjusts PWM to achieve speed regulation of the motor. Therefore, the control instruction in the present invention may be either a digital signal or an analog signal, that is, the motor brake may be controlled by a digital signal, and the voltage of the motor may be adjusted by pressing the speed regulation switch to a certain position to control the motor brake. The present invention adopts double insurance for the motor to ensure that the motor brakes safely, thereby improving the human-machine safety.

In the foregoing embodiment, the tool control unit in the grass trimmer may not only transmit a control parameter to the power control unit, but also transmit use information of the tool to peripheral equipment by means of wireless communication, so that the user can understand the basic situation and abnormal information of the tool for convenience of use and maintenance of the tool. The battery pack may perform signal transmission with the power control unit, and parameter information in the battery pack is transmitted to the power control unit by means of serial communication. The parameter information of the battery pack may be further transmitted to peripheral equipment by means of wireless communication, so that the user can understand the use information of the battery pack.

In an embodiment of the present invention, the power device of the electric tool is detachably connected to the tool body, and the power device includes a power control unit. When the power device is connected to the tool body, the power control unit may receive preset parameters provided by the parameter setting module, and control the working components to work according to the preset parameters provided by the parameter setting module.

In detail, the power device further includes a drive unit and a battery pack for supplying electric energy to the motor drive module. When the power device is connected to the tool body, the power control unit of the power device controls the rotation of the motor drive module according to the preset parameters from the parameter setting module of the tool body. The parameter setting module is electrically connected to the power control unit through a hot plug interface. The power control unit or the parameter setting module is an integrated chip circuit.

When the tool body is a working head of a multi-function machine, the working principle of the multi-function machine is that an output shaft swings around its own axis line, thereby driving the accessory working head mounted at a tail end of the output shaft to swing. Common working heads include straight saw blades, circular saw blades, triangular sanding discs, spade scrapers, and so on. Therefore, when a user mounts different accessory working heads on the output shaft, a variety of different operating functions, such as sawing, cutting, grinding, or scraping, can be achieved to meet different working requirements. In the working head of the multi-function machine, a blade, a connecting shaft and the like of the multi-function machine are equivalent to the working components of the multi-function machine. When the power device is connected to the working head of the multi-function machine, the power control unit receives data parameters from the parameter setting module provided on the tool body, that is, on the working head of the multi-function machine, and the power control unit may control the motor drive module to work according to the data parameters.

In more detail, for example, when the swing frequency of the working head of the multi-function machine is required to be 25 Hz, it is necessary to maintain a certain rotating speed of the motor of the power device that is connected with the working head of the multi-function machine. At this time, the parameter setting module provided in the working head of the multi-function machine transmits data parameters to the power control unit of the power device, and the power control unit receives the data parameters from the parameter setting module, and controls the motor speed of the motor drive module to maintain the swing frequency of the working head of the multi-function machine at 25 Hz.

In this way, when the tool body of the electric tool is the working head of the multi-function machine, the power device may control the motor of the motor drive module to be maintained at a certain rotating speed according to the data parameters sent by the parameter setting module provided on the tool body to the power control unit, thus controlling the working components of the tool body to be maintained at a certain working frequency.

The above merely illustrates an embodiment in which the parameter setting module may transmit a parameter for controlling the swing frequency of the working head of the multi-function machine to the power control unit, but the present invention is not limited thereto as long as the parameter for controlling the working head of the multi-function machine, which is sent by the parameter setting module to the power control unit, is within the scope of protection of the present invention.

In another embodiment, the parameter setting module may also provide the power control unit with control parameters for controlling the forward and reverse rotation of the motor. An electric drill is taken as the electric tool here. The working principle of the electric drill is that an output shaft continuously rotates in one direction, thereby driving an accessory working head mounted at a tail end of the output shaft to rotate. Common working heads include drill bits or screwdrivers. Therefore, when a user mounts different accessory working heads on the output shaft, a variety of different operating functions can be achieved to meet different working requirements. In the working head of the electric drill, a drill bit and a connecting shaft of the electric drill are equivalent to the working components of the electric drill. When the power device is connected to the working head of the electric drill, the power control unit receives data parameters from the parameter setting module provided on the tool body, that is, on the working head of the electric drill, and the power control unit may control the motor drive module to work according to the data parameters.

In more detail, for example, when the rotating speed of the working head of the electric drill is 50 r/s, it is necessary to maintain a certain rotating speed of the motor of the power device that is connected with the working head of the electric drill. At this time, the parameter setting module provided in the working head of the electric drill transmits data parameters to the power control unit of the power device, and the power control unit receives the data parameters from the parameter setting module, and controls the motor speed of the motor drive module to maintain the rotating speed of the working head of the electric drill at 50 r/s.

In this way, when the tool body of the electric tool is the working head of the electric drill, the power device may control the motor of the motor drive module to be maintained at a certain rotating speed according to the data parameters sent by the parameter setting module provided on the tool body to the power control unit, thus controlling the working components of the tool body to be maintained at a certain rotating speed.

The above merely illustrates an embodiment in which the parameter setting module may transmit a parameter for controlling the rotating speed of the working head of the electric drill to the power control unit, but the present invention is not limited thereto as long as the parameter for controlling the working head of the electric drill, which is sent by the parameter setting module to the power control unit, is within the scope of protection of the present invention.

The power device of the electric tool may be connected with a tool body having different working heads, and may receive data parameters from the tool body according to the characteristics of various different working heads, thus controlling the working head of the tool body connected with the power device to work according to the data parameters.

The power device of the electric tool of the present invention may be connected with different tool bodies, different types of tool bodies convert operation instructions of users into control parameters according to the same standard communication protocol and transmit the control parameters to the power device, and the power device converts, according to the standard communication protocol, the control parameters into corresponding operation instructions to control the motor. The power control unit has a program block, the program block has a default value, and the power control unit receives a control instruction transmitted by the tool control unit and writes the control instruction to the default value to form a complete program block to control the motor.

One power device matches a plurality of tool bodies and battery packs. For example, the power device is adapted to a first tool body, a second tool body and a third tool body, the first tool functionally includes $a_1$, $b_1$ and $c_1$, the second tool functionally includes $a_2$, $b_2$ and $c_2$, and the third tool functionally includes $a_3$, $b_3$ and $c_3$; if $b_1$, $b_2$ and $b_3$ are all speed regulation functions, only one speed regulation program segment needs to be arranged in the power device, and the speed regulation program segment has a default value; when a speed regulation instruction N1 of the first tool body is transmitted into the power device, the power control unit writes the speed regulation instruction N1 to the default value in the speed regulation program segment, that is, the speed regulation instruction N1 is combined with the speed regulation program segment, and a complete speed regulation program is formed to control a motor to operate at a rotating speed N1; and a speed regulation instruction N2 of the second tool body is transmitted into the power device, the speed regulation instruction N2 is wrote to the default value in the speed regulation program segment, that is, the speed regulation instruction N2 is combined with the speed regulation program segment, and a complete speed regulation program is formed to control the motor to operate at a rotating speed N2. Therefore, if a plurality of tool bodies has the same function, only one program segment is needed, which greatly simplifies the programs in the power device.

When the power device needs to be adapted to a new fourth tool body, the fourth tool body transmits a speed regulation instruction N4 to the power device, the power control unit writes the speed regulation instruction N4 to the default value in the speed regulation program segment, that is, the speed regulation instruction N4 is combined with the speed regulation program segment, and a complete speed regulation program is formed to control the motor to operate at a rotating speed N4. It is unnecessary to update program segments in the pre-power device. In this way, the power device only needs to be preset with a program segment of a plurality of functions, and can be matched with different types of tool bodies at a later stage without updating the program segments in the power device, thereby greatly expanding the compatibility of the power device.

In the present invention, the basis for sharing the power device 1 between different electric tool bodies can be realized because the power device 1 is a component shared by different electric tools. On the basis of sharing, preferably, the power device 1 of the present invention employs a long-life motor 13, such as a brushless motor, so that the performance of the motor can be maximized on the basis of sharing. In the process of sharing, the life of the battery pack 3 is shorter than that of the brushless motor. Therefore, the present invention proposes that the battery pack 3 is detachable from the main housing of the power device 1.

The present invention claims a power device that is detachably connected to the blower body, the grass trimmer body, the chain saw body, the lawnmower body, and the pruning shear body. When the power device is connected to the tool body, the power device may supply power to the connected tool body to enable the connected tool body to work smoothly and normally.

The present invention also claims a power device, capable of receiving electric energy supplied by different types of battery packs. The power device is detachably connected to a battery pack, and a battery pack control unit converts a battery pack instruction into a control parameter corresponding to a control instruction and transmits the control parameter to a power control unit. Preferably, when the power device is adapted to a certain tool body, the power control unit receives a control instruction transmitted by the tool control unit, and controls the motor according to the control instruction. The power control unit has a program block, the program block has a default value, and the power control unit receives a control parameter transmitted by the battery pack control unit and writes the control parameter to the default value to form a complete program block. The control instruction is transmitted from the battery pack control unit to the power control unit by means of serial communication.

The present invention claims an electric tool system, including the power device, a battery pack and at least one tool body, where the power device is capable of powering the at least one tool body. The tool body may be the blower body, the grass trimmer body, the chain saw body, the lawnmower body, the pruning shear body, the multi-function machine body, the electric drill body, etc. The power device and the battery pack are mated with the tool body detachably to constitute a complete electric tool. The power device may supply power to the connected tool body to enable the connected tool body to work smoothly and normally.

When a plurality of operation instructions is simultaneously generated and the plurality of operation instructions includes a safety instruction and a manipulation instruction, the safety instruction is preferentially generated, or when the safety instruction and the manipulation instruction are transmitted in parallel by the tool control module to the power control module, the power control unit prioritizes the safety instruction.

Preferably, the control instruction is preset with a priority, and the tool control unit transmits the manipulation instruction to the power control unit in descending order of the priority.

According to an electric tool control method of the present invention, the power control unit and the tool control unit convert data through the same communication protocol, and may convert operation instructions received by different types of tool bodies into control parameters according to a standard communication protocol, and the power device converts the control parameters into corresponding operation instructions, thereby enabling the power device to be commonly used between different tool bodies.

The technical features of the embodiments described above may be randomly combined. For brevity of description, all possible combinations of the technical features in the foregoing embodiments are not described, however, as long as there is no contradiction in the combinations of these technical features, they should be considered as falling within the scope of this specification.

The foregoing embodiments only show several implementations of the present disclosure and are described in detail, but they should not be construed as a limit to the patent scope of the present disclosure. It should be noted that, a person of ordinary skill in the art may make various changes and improvements without departing from the ideas of the present invention, which shall fall within the protection scope of the present invention. Therefore, the protection scope of the patent of the present invention shall be subject to the claims.

What is claimed is:

1. A power device, capable of powering different types of tool bodies, wherein
   the tool body comprises a tool control unit;
   the power device is detachably connected to the tool body, and the power device comprises a main housing, a motor located in the main housing, and a power control unit for controlling the motor located in the main housing;
   when the power device is adapted to a certain tool body, the power control unit receives a control instruction transmitted by the tool control unit, and controls the motor according to the control instruction; and
   wherein the power control unit has a program block, the program block is preset with a priority, and the power control unit executes the program block in descending order of the priority.

2. The power device according to claim 1, wherein the power device receives electric energy from different types of battery packs, and the power control unit receives a control instruction transmitted by a battery pack, and controls the operation of the motor according to the control instruction transmitted by the battery pack.

3. The power device according to claim 2, wherein the battery pack transmits a control instruction to the tool body, and the tool control unit in the tool body transmits an instruction which includes a control instruction transmitted by the battery pack and a control instruction generated in the tool body to the power control unit.

4. The power device according to claim 2, wherein the battery pack transmits a control instruction to the power control unit, and the tool control unit transmits the control instruction to the power control unit for controlling the operation of the motor.

5. The power device according to claim 4, wherein the tool body has a tool electrical interface, the battery pack has a battery electrical interface, the power device comprises a data bus, and the battery electrical interface of the battery pack and the tool electrical interface of the tool body are respectively connected to the data bus.

6. The power device according to claim 2, wherein the battery pack has a battery electrical interface, the power device has a device electrical interface, the battery electrical interface is electrically connected with the device electrical interface and transmits, at least, the control instruction of the battery pack to the power device, and the tool body has a tool electrical interface which is electrically connected with the device electrical interface and transmits, at least, the control instruction of the tool body to the power device.

7. The power device according to claim 2, wherein the battery pack has a battery electrical interface, the power device has a device electrical interface, the tool body has a tool electrical interface which is electrically connected with the device electrical interface and transmits, at least, the control instruction of the tool body to the power device, the battery electrical interface is electrically connected with the tool electrical interface, and the control instruction of the battery pack is transmitted to a power control device through the interior of the tool body.

8. The power device according to claim 2, wherein the power control unit prioritizes the control instruction transmitted by a battery pack.

9. The power device according to claim 8, wherein the battery pack is provided with a battery pack control module for detecting battery pack parameter information, converting the battery pack parameter information into a battery pack control instruction and transmitting the battery pack control instruction to the power control unit.

10. The power device according to claim 1, wherein the control instruction is preset with a priority, and the tool control unit transmits the control instruction to the power control unit in descending order of the priority.

11. The power device according to claim 10, wherein the tool body further comprises an operation component for generating an operation instruction, the control instruction comprises the operation instruction, the tool control unit converts the operation instruction into a control parameter corresponding to the operation instruction and transmits the control parameter to the power control unit, and the power control unit receives the control parameter and converts the control parameter into a control instruction to control the operation of the motor.

12. The power device according to claim 11, wherein the operation instruction comprises a safety instruction and a manipulation instruction, and when the operation instruction is transmitted from the tool control unit to the power control unit, the safety instruction is preferentially transmitted.

13. The power device according to claim 12, wherein the tool control unit comprises a communication module, the power control unit comprises a communication module, and when the operation instruction is transmitted from the tool control unit to the power control unit through the communication module, the safety instruction is preferentially transmitted.

14. The power device according to claim 12, wherein the tool control unit comprises a communication module, the power control unit comprises a communication module, the manipulation instruction is transmitted from the tool control unit to the power control unit through the communication module, and the safety instruction is transmitted from the tool control unit to the power control unit through an analog circuit.

15. The power device according to claim 1, wherein the power device comprises a motor and at least a battery pack, where the battery pack supplies electric energy to the motor and the tool body, and the battery pack is disposed within the tool body and detachable from the tool body, the power device and the tool body being connected in parallel between the positive and negative electrodes of the battery pack.

16. The power device according to claim 15, wherein the electric energy of the battery pack is decomposed into a first path and a second path on the tool body, the first path supplying electric energy to the tool body, the second path supplying electric energy to the power device.

17. The power device according to claim 1, wherein the power device and the tool body are provided with a wireless communication module respectively, and the power device and the tool body wirelessly transmit a control instruction, Tthe power device or the tool body transmit data wirelessly with peripheral equipment through the wireless communication module.

18. An electric tool, comprising:
a tool body and a power device capable of powering different types of tool bodies, wherein
the tool body further comprising a tool control unit;
the power device being detachably connected to the tool body, and further comprising a main housing, a motor located in the main housing, and a power control unit for controlling the motor located in the main housing; wherein
when the power device is adapted to a certain tool body, the power control unit receives a control instruction transmitted by the tool control unit, and controls the motor according to the control instruction; and
wherein the power control unit has a program block, the program block is preset with a priority, and the power control unit executes the program block in descending order of the priority.

19. An electric tool system, comprising:
a power device, at least two tool bodies, and a battery pack being detachably connected to the tool bodies, respectively, the power device being capable of powering the at least two tool bodies, wherein
the tool body further comprising a tool control unit;
the power device being detachably connected to the tool body, and further comprising a main housing, a motor located in the main housing, and a power control unit for controlling the motor located in the main housing; wherein
when the power device is adapted to a certain tool body, the power control unit receives a control instruction transmitted by the tool control unit, and controls the motor according to the control instruction; and
wherein the power control unit has a program block, the program block is preset with a priority, and the power control unit executes the program block in descending order of the priority.

* * * * *